(12) United States Patent
Bowden

(10) Patent No.: US 12,553,483 B2
(45) Date of Patent: Feb. 17, 2026

(54) FRICTION DEVICE WITH BONDING INSERTS

(71) Applicant: RFPC HOLDING CORP., Wilmerding, PA (US)

(72) Inventor: Alan Gary Bowden, Laurinburg, NC (US)

(73) Assignee: RFPC Holding Corp., Wilmerding, PA (US)

( * ) Notice: Subject to any disclaimer, the term of this patent is extended or adjusted under 35 U.S.C. 154(b) by 129 days.

(21) Appl. No.: 18/334,171

(22) Filed: Jun. 13, 2023

(65) Prior Publication Data

US 2023/0323926 A1     Oct. 12, 2023

Related U.S. Application Data

(63) Continuation-in-part of application No. 17/514,074, filed on Oct. 29, 2021, now Pat. No. 11,713,792.
(Continued)

(51) Int. Cl.
F16D 65/06     (2006.01)
F16D 69/04     (2006.01)

(52) U.S. Cl.
CPC ....... *F16D 65/062* (2013.01); *F16D 69/0416* (2013.01)

(58) Field of Classification Search
CPC .... F16D 65/062; F16D 69/0416; F16D 65/06; F16D 65/0037; F16D 69/026; F16D 2069/0441
See application file for complete search history.

(56) References Cited

U.S. PATENT DOCUMENTS 1,308,402 A  *  7/1919  Dickinson ............. F16D 65/062
                                                      188/252
1,638,759 A  *  8/1927  Cobb, Jr. ............... B22D 15/00
                                                      188/257
(Continued)

FOREIGN PATENT DOCUMENTS

BR     PI0721619 A2 *  2/2013
EA         029533 B1     2/1998
(Continued)

OTHER PUBLICATIONS

Office Action mailed Jul. 21, 2023 for corresponding Eurasian patent application No. 202390706 (6 pages).
(Continued)

*Primary Examiner* — Vishal R Sahni
(74) *Attorney, Agent, or Firm* — K&L Gates LLP

(57) ABSTRACT

A friction device may include a backing plate connected with a friction material. The friction device may include a conditioning insert at least partially embedded within the friction material. The conditioning insert may include opposite first and second longitudinal sides that extend from the backing plate to the conditioning surface and opposite first and second lateral sides that extend from the backing plate to the conditioning surface. The first longitudinal side, the second longitudinal side, the first lateral side, and/or the second lateral side of the conditioning insert can include one or more protrusions extending away from the first longitudinal side, the second longitudinal side, the first lateral side, and/or the second lateral side and into the friction material.

30 Claims, 19 Drawing Sheets

Related U.S. Application Data which is a continuation-in-part of application No. PCT/US2020/037144, filed on Jun. 11, 2020.

(60) Provisional application No. 62/860,065, filed on Jun. 11, 2019, provisional application No. 62/859,951, filed on Jun. 11, 2019.

(56) References Cited

U.S. PATENT DOCUMENTS

| | | | | |
|---|---|---|---|---|
| 8,267,229 | B2 * | 9/2012 | Kahr | F16D 65/062 |
| | | | | 188/250 G |
| 2003/0234142 | A1 * | 12/2003 | Shute | B61H 1/00 |
| | | | | 188/250 B |
| 2009/0127037 | A1 * | 5/2009 | Kahr | F16D 65/0037 |
| | | | | 188/250 B |
| 2011/0132705 | A1 * | 6/2011 | Rumph | F16D 65/0037 |
| | | | | 188/234 |
| 2022/0299078 | A1 * | 9/2022 | Bowden | F16D 65/062 |

FOREIGN PATENT DOCUMENTS

| | | | | | |
|---|---|---|---|---|---|
| EP | | 4060201 | A1 * | 9/2022 | F16D 65/0037 |
| JP | H | 10-30661 | * | 2/1998 | |
| JP | | H1030661 | A | 2/1998 | |
| JP | | H11141583 | A | 5/1999 | |
| RU | | 174752 | U1 * | 10/1931 | |
| WO | WO-2010019438 | | A1 * | 2/2010 | F16D 65/0037 |
| WO | WO-2021010931 | | A1 * | 1/2021 | B60T 5/00 |

OTHER PUBLICATIONS

Search report mail Jul. 7, 2023 for corresponding Eurasian patent application No. 202390706 (5 pages).

* cited by examiner

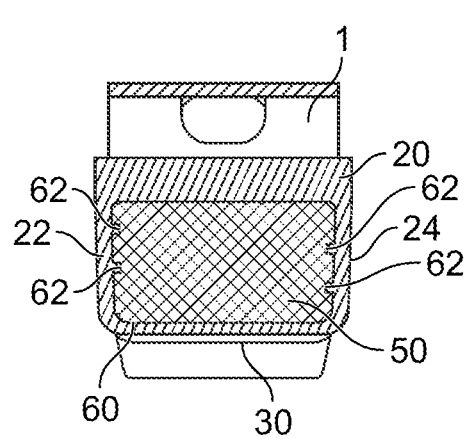
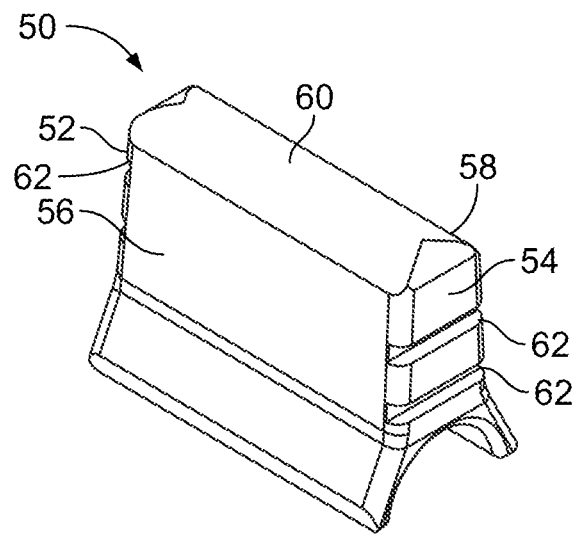
FIG. 8  FIG. 9
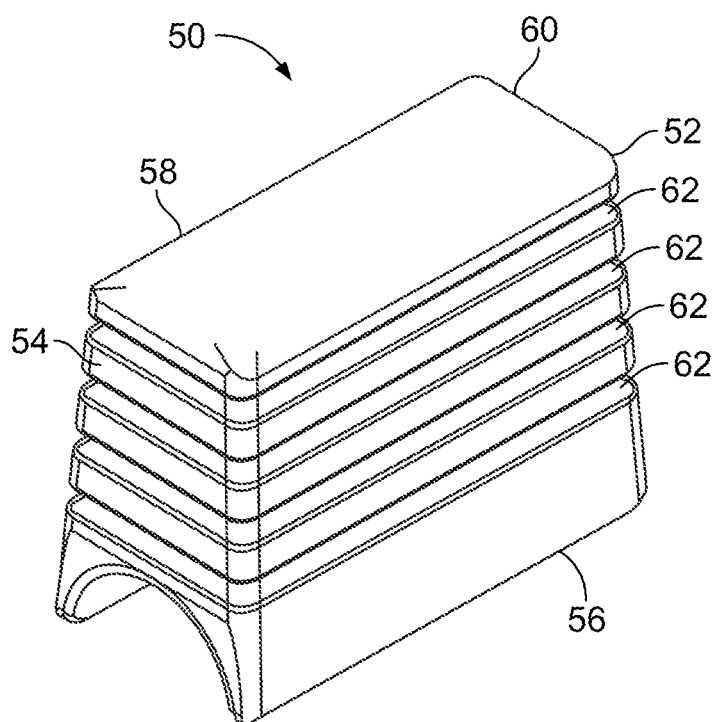
FIG. 10

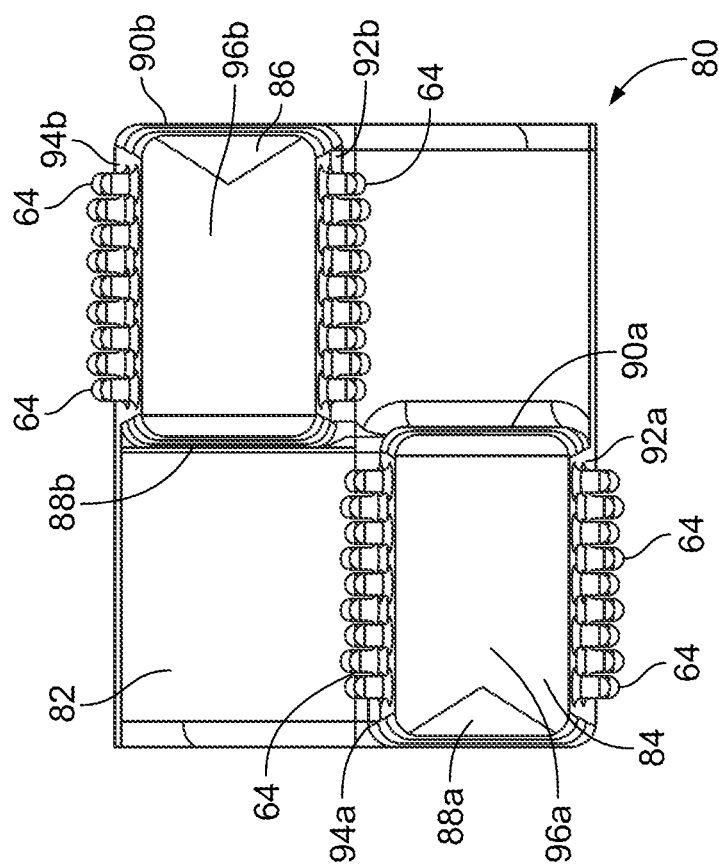
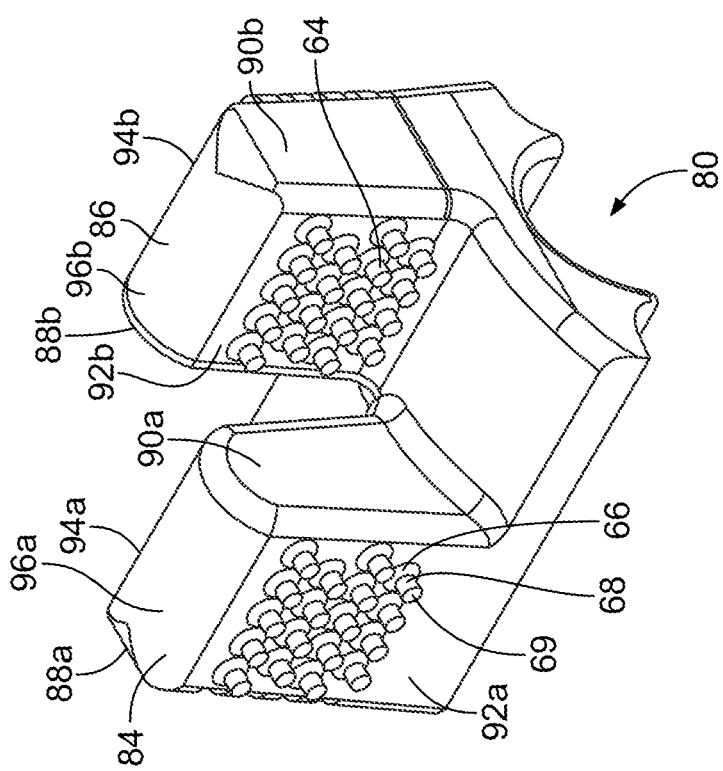
FIG. 24B
FIG. 24A

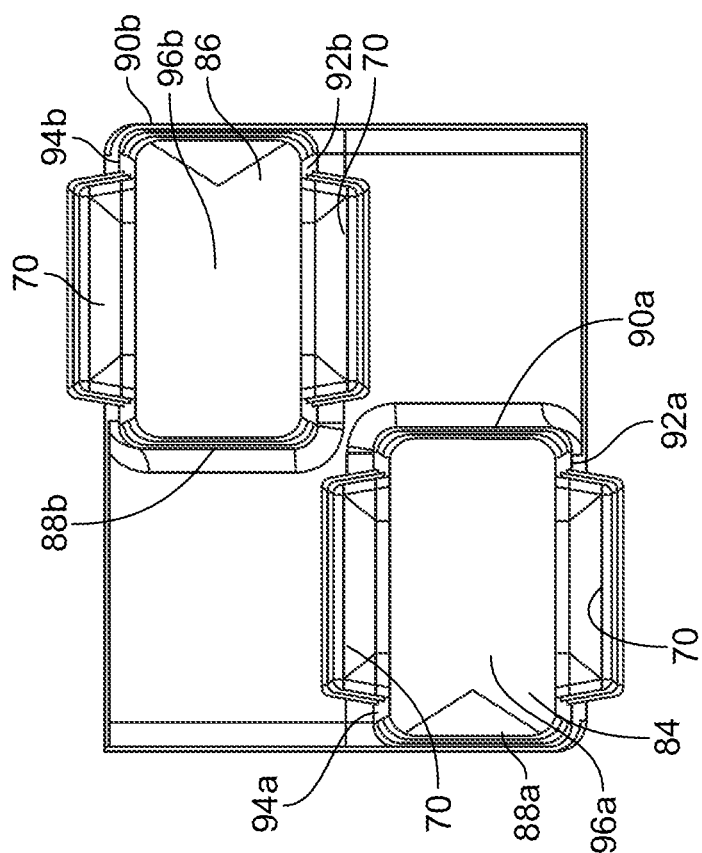
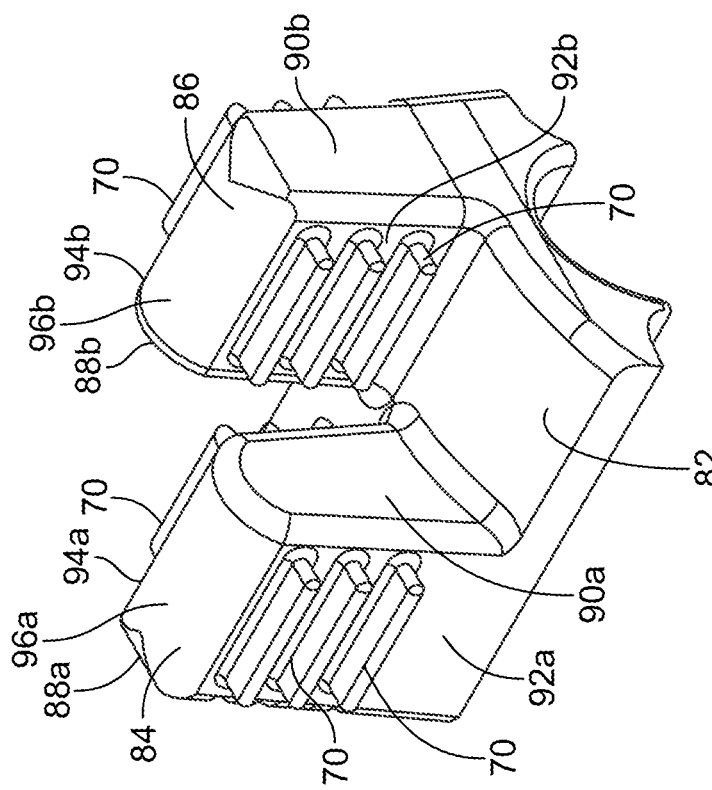
FIG. 25B
FIG. 25A ved
FRICTION DEVICE WITH BONDING INSERTS

CROSS-REFERENCE TO RELATED APPLICATIONS

This application is a continuation-in-part of and claims priority to U.S. patent application Ser. No. 17/514,074 (filed 29 Oct. 2021), which is a bypass continuation-in-part of and claims priority to International Patent Application No. PCT/US2020/37144 (filed 11 Jun. 2020), which claims priority to U.S. Provisional Application Nos. 62/859,951 and 62/860,065 (both of which were filed 11 Jun. 2019). The entire disclosures of these applications are incorporated herein by reference.

BACKGROUND

Technical Field

The subject matter described herein relates to a friction device having a conditioning insert with improved bonding features and/or a bonded, tread conditioning insert for conditioning a surface of a rotating object, such as (but not limited to) a wheel.

Description of Art

Various types of friction devices (e.g., brake shoes) having different compositions are used to achieve specific braking requirements. For example, these compositions may include cast iron and other types of friction materials that are specifically formulated for several predetermined applications. These various types of friction material may exhibit several uniquely different friction characteristics upon a wheel of a vehicle, specifically the wheel tread.

These various types of friction material will normally exhibit several uniquely different friction characteristics. Such friction characteristics, for example, include both high friction material and low friction material which are usually selected based on braking performance requirements. Secondary beneficial functions, such as reconditioning a wheel surface that may have surface defects, may be considered when selecting a friction material. These benefits may be realized with the addition of a friction material insert within the friction device.

Some friction devices have a friction material insert disposed therein. For example, U.S. Pat. No. 6,241,058 to Schute describes such a friction device. FIGS. 1 through 5 show a friction device 10 having a wheel conditioning insert 6 disposed therein. The friction device includes a backing plate 3 that may be made of metallic material such as steel, but other reinforced composite materials suitable for use with railway vehicles may be used. The backing plate includes a key bridge 1. The key bridge may be integrally formed to the backing plate, or the key bridge may be attached prior to installation of the friction device. The backing plate includes a pair of rejection lugs 2 that may be integrally formed with the backing plate and extend from a top surface thereof. The rejection lugs are sized and positioned in such a way to mate with corresponding rejection lug receptacles on a corresponding brake head. The rejection lugs may be configured to be compatible with a variety of brake heads or the lugs may be configured to only correspond with a certain type of brake head to prevent the installation of the friction device on an improper brake head.

As shown in FIGS. 3 and 4 of Schute, a composition friction material 5 extends from the backing plate to provide the required friction and braking effort when forced against the tread of a railway vehicle wheel. The composition friction material has a generally arcuate brake surface 7 to conform to the shape of the wheel of the vehicle. Embedded in the composition friction material is a wheel conditioning insert. The wheel conditioning insert is fully encapsulated by the composition friction material, but after repeated uses of the friction device, the composition friction material will wear away and expose the wheel conditioning insert to the vehicle wheel. As the friction device is applied to the vehicle wheel, the brake surface of the composition friction material will apply a braking force to the wheel. The wheel conditioning insert will apply a braking force to the wheel, but the insert serves to condition the wheel, such as by removing defects such as shells or spalls.

The addition of a wheel conditioning insert may lessen the stability of the composition friction material surrounding the insert. Specifically, the use of a wheel conditioning insert may lead to cracking, degradation, or loosening of the friction device material around the wheel conditioning insert. Better bonding or attachment between the friction material insert and the friction device material would be desirable to prevent cracking or degradation of the friction device material.

Additionally, because braking performance is a prime function of friction devices, use of lower-type friction material may be adequate for braking purposes. However, lower-type friction material provides no consideration for the secondary beneficial function of reconditioning a wheel tread surface. A wheel tread surface may have certain surface defects such as shells or spalls. Removal of these defects will normally extend the useful life of a wheel that is in service.

A friction device surface could be used which would be aggressive as far as reconditioning the wheel surface. However, this design may not provide appropriate friction levels for braking and may have a disadvantage of creating significant sparking during brake applications which could result in a hazardous condition. There is another friction device design which is a shoe material made entirely from an aggressive grinding type material; however, this shoe must be applied and then immediately removed after a very low speed brake application.

It may be desirable to have a system and method that differs from those that are currently available.

BRIEF SUMMARY

In one example, a friction device is provided that may include a backing plate connected with a friction material having a braking surface that can engage a surface of a rotating part to slow or stop rotation of the rotating part. The friction device also may include a conditioning insert at least partially embedded within the friction material. The conditioning insert can extend from the backing plate toward the braking surface of the friction material. The conditioning insert may include a conditioning surface spaced apart from the backing plate and positioned to face the surface of the rotating part. The conditioning insert may include opposite first and second longitudinal sides that extend from the backing plate to the conditioning surface and opposite first and second lateral sides that extend from the backing plate to the conditioning surface. The first longitudinal side, the second longitudinal side, the first lateral side, and/or the second lateral side of the conditioning insert can include one or more protrusions extending away from the first longitudinal side, the second longitudinal side, the first lateral side, and/or the second lateral side and into the friction material.

In another example, a friction device is provided that can include a backing plate connected with a friction material that can engage a surface of a rotating part to slow or stop rotation of the rotating part. The friction device may include a conditioning insert at least partially embedded within the friction material. The conditioning insert can extend from the backing plate toward the braking surface of the friction material. The conditioning insert may include a conditioning surface spaced apart from the backing plate and positioned to face the surface of the rotating part. The conditioning insert may include opposite longitudinal sides extending from the backing plate to the conditioning surface and opposite lateral sides extending from the backing plate to the conditioning surface. The longitudinal sides and/or the lateral sides of the conditioning insert may include protrusions extending away from the one or more of the longitudinal sides or the lateral sides and into the friction material.

In another example, a friction device is provided that can include a backing plate connected with a friction material having a braking surface configured to engage a surface of a rotating part to slow or stop rotation of the rotating part. The friction device also may include conditioning insert at least partially embedded within the friction material. For example, part but less than all of the insert can be surrounded by the friction material with the remainder of the insert outside of the friction material (except for the interface of the surface of the conditioning insert and the back plate or backing plate of the friction device). Alternatively, all of the insert may be embedded in the friction material (except for the interface of the surface of the conditioning insert and the back plate of the friction device). The conditioning insert may extend from the backing plate toward the braking surface of the friction material. The conditioning insert can include a conditioning surface spaced apart from the backing plate and positioned to face and condition the surface of the rotating part. The conditioning insert may include sides that extend from the backing plate to the conditioning surface. One or more of the sides of the conditioning insert can include protrusions extending away from the side(s) and into the friction material.

BRIEF DESCRIPTION OF THE DRAWINGS

The inventive subject matter may be understood from reading the following description of non-limiting embodiments, with reference to the attached drawings, wherein below:

FIG. 8 is a cross-sectional view of the friction device shown in FIG. 6 along line B-B;

FIG. 9 is a perspective view of another example of a conditioning insert;

FIG. 10 is a perspective view of another example of a conditioning insert;

FIG. 24A is a perspective view of another example of a conditioning insert;

FIG. 24B is a bottom view of the conditioning insert shown in FIG. 24A;

FIG. 25A is a perspective view of another example of a conditioning insert;

FIG. 25B is a bottom view of the conditioning insert shown in FIG. 25A;

DETAILED DESCRIPTION

Figure 4:
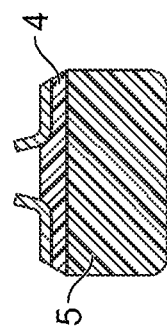
FIG. 4 is a cross-sectional view of the friction device shown in FIG. 1 along line IV-IV in FIG. 1.
Figure 5:
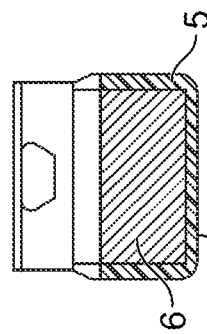
FIG. 5 is a cross-sectional view of the friction device shown in FIG. 1 along line V-V in FIG. 2.
Figure 3:
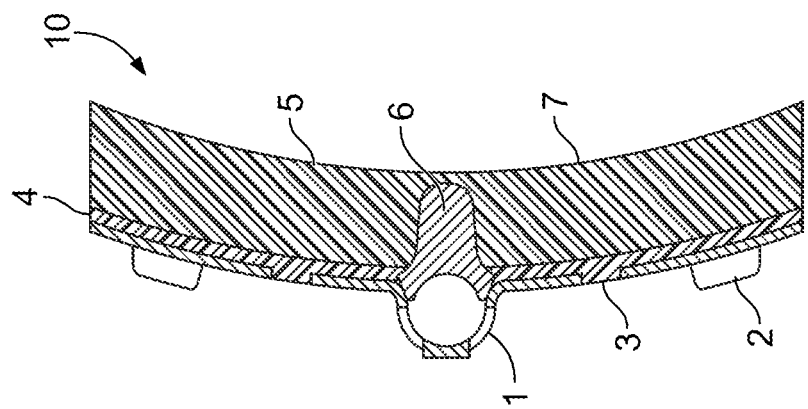
FIG. 3 is a cross-sectional view of the friction device shown in FIG. 1 along line in FIG. 1.
Figure 2:
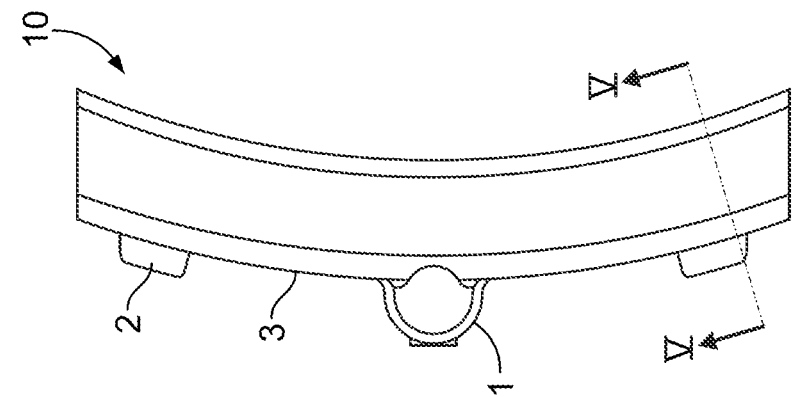
FIG. 2 is a side view of the friction device shown in FIG. 1.
Figure 1:
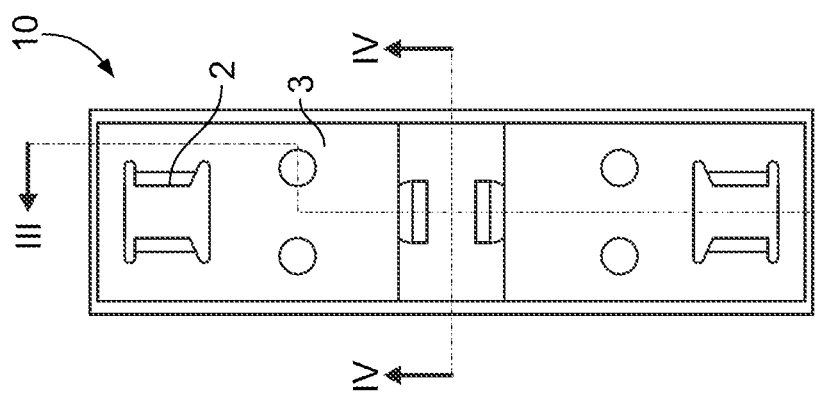
FIG. 1 is a top view of one example of a friction device.

One or more embodiments of the inventive subject matter described herein provide a friction device for use on a system having a rotating object or part. This system may be a vehicle having rotating wheels, but also may be a stationary system having a rotating part that is not a vehicle and is not a wheel. A suitable friction device can be a brake shoe, for example, and the vehicle may be a railway vehicle. In other embodiment, the vehicle can be another type of vehicle. The friction device may include various subcomponents, some of which may be optional. These components may include a backing plate, a composition friction material, a conditioning insert, a flange, a rejection lug, a key bridge, an adhesive layer, wear indicators, and the like.

When deployed, the backing plate may interface with and couple to a brake head of the vehicle. The composition friction material that is disposed onto the backing plate may define a brake surface that can engage with a rotating part (e.g., a wheel of a vehicle). The friction from the engagement can be controlled by the brake head. While engaged, the brake surface retards rotation of the rotating part and can slow (or stop) rotation of the rotating part (and/or the system, e.g., the vehicle).

The composition friction material can define a pad or brake pad. The composition friction material may have a longitudinal flange side, a longitudinal rim side, opposite sides, longitudinal ends or sides, and lateral sides.

One or more conditioning inserts may be embedded (partially or entirely) within the friction material. These inserts may project from the backing plate to conditioning surfaces, ends, or faces. The inserts may include opposite lateral sides and opposite longitudinal sides that intersect the conditioning surface. One or more of these sides may include grooves and/or protrusions. The protrusions may be elongated columns such as pegs with a base portion extending from the longitudinal ends and a head portion extending from the base portion. The protrusions may be elongated fins extending along the longitudinal ends. The lateral sides may include at least one groove extending at least partially into the conditioning insert to receive the composition friction material in the groove(s). The protrusions may extend from the surface(s) of the insert device in directions that are parallel to each other and/or in directions that do not or will not intersect the surface of the rotating part.E The conditioning insert(s) may be formed of a material different than the composition friction material. For example, the conditioning insert may be more rigid, have a greater hardness, or the like, than the composition material such that the composition material wears away at a faster rate than the conditioning insert while both the composition material and the conditioning insert are exposed to and placed into contact with the same rotating surface for the same duration.

Another example of a friction device may include a backing plate adapted to interface with a brake head of a vehicle and a composition friction material disposed on the backing plate to form a brake surface of the friction device for engaging a rotating part (e.g., a wheel of the vehicle). The composition friction material may have a longitudinal flange side, a longitudinal rim side, and opposite ends. The friction device may include at least one conditioning insert disposed within the composition friction material. The conditioning insert may include a base portion having a first side nearest the backing plate, a second side extending from the first side in a direction toward the brake surface, and a longitudinal axis. The first side optionally can be referred to as a backing plate side as this side is closer to the backing plate than the second side. The second side optionally can be referred to as a brake surface side as this side is closer to the brake surface than the first side. The brake surface side can be the conditioning surface, side, or end described above.

A first insert body can extend from the brake surface side of the base portion and can be offset from the longitudinal axis in the direction of the longitudinal flange side. A second insert body can extend from the brake surface side of the base portion and can be offset from the longitudinal axis in the direction of the longitudinal rim side. For example, the first insert body can be closer to the flange side than the second insert body, and the second insert body can be closer to the rim side than the first insert body. The first insert body can be referred to as a flange side insert body and the second insert body can be referred to as a rim side insert body. Each of the flange side insert body and the rim side insert body can include opposite longitudinal sides, lateral sides, and a conditioning surface for engaging the rotating part (e.g., the wheel of the vehicle).

The portion having the composition friction material can have a longitudinal flange side, a longitudinal rim side, opposite ends, and at least one conditioning insert disposed or embedded within the composition friction material. The conditioning insert can include a conditioning surface for engaging the rotating object or part, opposite longitudinal sides, and opposite lateral sides. The lateral sides of the insert can include at least one groove extending at least partially into the conditioning insert. The groove(s) can receive the composition friction material in the groove(s). The groove(s) may include several grooves vertically stacked atop each other along the lateral sides. The groove(s) may at least partially extend into the conditioning insert along the longitudinal sides. The groove(s) may include several grooves vertically stacked atop of each other along the lateral sides and the longitudinal sides.

The friction device may include protrusions extending from the longitudinal ends. The protrusions may be or may include elongated fins that may engage with the composition friction material.

The longitudinal sides of the insert bodies may include protrusions that can engage the composition friction material at a distance away from the backing plate. The protrusions may be columns or pins including a base portion extending from the longitudinal sides and a head portion extending into the composition friction material. The lateral sides of the insert bodies may include at least one groove extending at least partially into the conditioning insert to receive the composition friction material. The longitudinal sides of the insert bodies may include protrusions that can engage the composition friction material.

The conditioning surfaces of the insert bodies may extend beyond the brake surface of the composition friction material. The conditioning insert(s) may be connected to the backing plate. During operation, the fins may act as a wear indicator insofar as the fins may visibly protrude at or near a rejection or condemnation line at which the composition friction material should be replaced. For example, the fins may not be visible during operation of the friction device before replacement of the composition friction material is needed. Over time, the composition friction material may wear away such that one or more of these fins may become visible outside of the friction material to an observer without specialized viewing equipment (e.g., the fins may be at least partially visible to the naked eye). This visibility of the fins outside of the friction material may indicate that the friction device and/or the friction material is in need of replacement to continue with safe operation of the friction device.

The fins may be more thermally conductive than the composition friction material and may act as thermal conduits to pipe heat out from the body of the composition friction material and radiate the heat to the external or ambient environment. The fins may create additional surface area for securing the composition friction material to the backing plate.

The friction device may be used on a vehicle and can include a backing plate adapted to interface with a brake head of the vehicle. The friction device can include composition friction material disposed on the backing plate to form a brake surface of the friction device for engaging a wheel of the vehicle. The composition friction material may have a longitudinal flange side, a longitudinal rim side, and opposite ends that connect the longitudinal flange and rim sides with each other.

The lateral sides may include at least one groove extending at least partially into the conditioning insert to receive the composition friction material therein. Optionally, there can be two or more grooves vertically stacked atop of each other along the lateral sides. The groove(s) can extend at least partially into the conditioning insert along the longitudinal sides. The groove(s) can include multiple grooves vertically stacked atop of each other along the lateral sides and along the longitudinal sides. The friction device may include protrusions extending from the longitudinal sides. The protrusions can be elongated fins that engage the composition friction material.

The backing plate may interface with a brake head of a vehicle, and a composition friction material disposed on the backing plate may form a brake surface of the friction device for engaging a wheel the vehicle. The friction device can include at least one conditioning insert disposed within the composition friction material. The conditioning insert can include a conditioning surface for engaging the wheel of the railway vehicle, opposite longitudinal sides, and opposite lateral sides. The longitudinal sides and/or the lateral sides can include protrusions that can engage the composition friction material at a distance away from the backing plate.

The protrusions may include columns having base portions extending from the longitudinal sides and head portions extending from the base portions. The protrusions can be elongated fins extending vertically along the longitudinal sides. The lateral sides may further define or include at least one groove extending at least partially into the conditioning insert to receive the composition friction material therein. The conditioning insert can be formed of a material different than the composition friction material.

The friction device can include a backing plate adapted to interface with a brake head of a vehicle and can include a composition friction material disposed on the backing plate to form a brake surface of the friction device for engaging a wheel of the vehicle. The friction device may include at least one conditioning insert disposed within the composition friction material. The insert may include a base portion having a first side nearest or closer to the backing plate than another (e.g., second) side, the second side extending from the first side in a direction toward the brake surface, and a longitudinal axis. A first insert body can extend from the second side of the base portion and be offset from the longitudinal axis in the direction of the longitudinal flange side. A second insert body can extend from the second side of the base portion and be offset from the longitudinal axis in the direction of the longitudinal rim side. The first insert body and the second insert body each can include opposite longitudinal sides, opposite lateral sides, and a conditioning surface for engaging the wheel of the vehicle.

The longitudinal sides of the insert bodies can include protrusions that can engage the composition friction material at a distance away from the backing plate. The protrusions can include columns having base portions extending from the longitudinal sides and head portions extending into the composition friction material. The protrusions can be elongated fins. In one example, the protrusions for an insert can include only pins or columns, only fins, or a combination of pins/columns and fins.

The lateral sides of the insert bodies can define at least one groove extending at least partially into the conditioning inserts to receive the composition friction material. The longitudinal sides of the insert bodies can include protrusions that can engage with the composition friction material.

The conditioning surfaces of the insert bodies can extend beyond the brake surface of the composition friction material. The conditioning insert(s) can be connected to the backing plate, such as by extending or protruding from the backing plate toward the conditioning surfaces.

The subject matter described herein can provide friction devices having at least one bonded insert having various features to improve the bonding between the insert and the composition friction material that makes up a majority of the volume of the friction device. Unlike other friction devices, the friction devices described herein may provide an advantageous conditioning surface for a surface of a rotating part while maintaining improved boding characteristics between the insert responsible for the conditioning and the composition friction material responsible for supplying a braking force to the rotating part.

Figure 6:
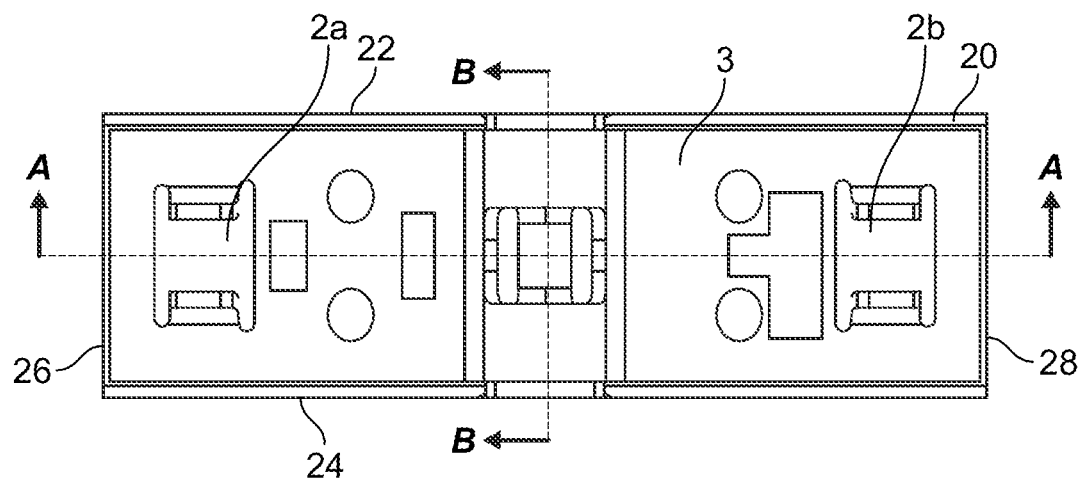
FIG. 6 is a top view of another example of a friction device.

Referring to FIGS. 6 through 8, a friction device in accordance with at least one example is illustrated. The backing plate may be arcuate in shape to permit the friction device to properly interact against a rotating part (e.g., a wheel of a vehicle). The backing plate may include two or more rejection lugs 2a, 2b. The rejection lugs may be integrally formed with the backing plate or may be attached to the backing plate. The rejection lugs may extend or upwardly project from a top surface of the backing plate. The rejection lugs can be sized and positioned to mate with corresponding rejection lug receptacles in a corresponding brake head that can move the friction device toward and away from the rotating part or object. The rejection lugs may be compatible with a variety of brake heads or the rejection lugs may be shaped to only correspond with a certain type of brake head to prevent installation of the friction device on an improper brake head.

In one embodiment, the friction device may include a key bridge 4. A suitable key bridge may be integrally formed with the backing plate or may be separately formed and connected with the backing plate. Like the backing plate, the key bridge may be made of a metallic material or a reinforced composite material. The key bridge may be coupled to the brake head of a vehicle. An opening 8 in the key bridge may accept a locking key which fastens the friction device to the vehicle brake head. In the illustrated embodiment, the key bridge may be generally circular, but in other embodiments the key bridge may take a shape to facilitate fastening of the key bridge to the brake head.

The friction device may include a composition friction material 20. The composition friction material may be affixed to and extend from the backing plate along the surface opposite the rejection lugs and the key bridge. The composition friction material can include a layer of an adhesive to facilitate proper fixture to the backing plate. Optionally, the composition friction material may be affixed to the backing plate by another technique.

The composition friction material may have a flange side 22 that faces a flange of the rotating part or object (such as a wheel of a railway vehicle), a rim side 24 facing a rim of the rotating part or object, and first and second opposite ends or sides 26, 28. The flange and rim sides can extend along the length of the friction device, and the opposite ends can extend between and connect the flange and rim sides with each other. The flange may extend from the friction device and ride (or extend) over the flange of the rotating part or object. This may align the friction device with the rotating part during use.

The composition friction material forms a brake surface 30 of the friction device. The brake surface can contact a tread or surface of the rotating part to apply a braking force to the rotating part. The brake surface may contact parts or all the tread or surface, the flange, and/or the rim of the rotating part. The composition friction material may have or take the arcuate shape of the backing plate so as to properly interact against the surface or tread of the rotating part. The brake surface may take the arcuate shape of the backing plate. The composition friction material may be a composite material that provides the required friction and braking effort when forced against the rotating part. The material providing the braking force can be a composite material or may be metal or metal alloy that can apply the proper braking force to the rotating part. With respect to vehicles, the material selection may be determined with reference to the type, duty use, and/or operating environment of the vehicle.

At least one conditioning insert may be disposed in the composition friction material to provide braking and/or conditioning features to the friction device. Referring to FIGS. 7A through 10, one example of a conditioning insert 50 is shown. As shown in FIG. 9, the conditioning insert may include or be a body having different sets or pairs of opposite sides. These sets or pairs include (a) a first lateral end or side 52 and an opposite second lateral end or side 54, (b) a first longitudinal end or side 56 and an opposite second longitudinal end or side 58, and (c) a conditioning surface or side 60 and an opposite curved and radially inward side (e.g., the bottom side of the body shown in the Figures). The first and second lateral ends or sides can extend across the conditioning insert, and the first and second longitudinal ends or sides can extend between the first and second lateral ends or sides.

As shown, each of the longitudinal sides can connect and extend between the lateral sides and each of the lateral sides can connect and extend between the longitudinal sides. The longitudinal sides can extend along opposite edges of the wheel conditioning surface and the lateral sides can extend along other opposite edges of the wheel conditioning surface. The longitudinal sides may be angled toward each other and toward the conditioning surface. For example, the longitudinal sides can be oriented at an acute angle relative to each other such that the surfaces of the longitudinal sides converge or merge toward each other.

Figure 7A:
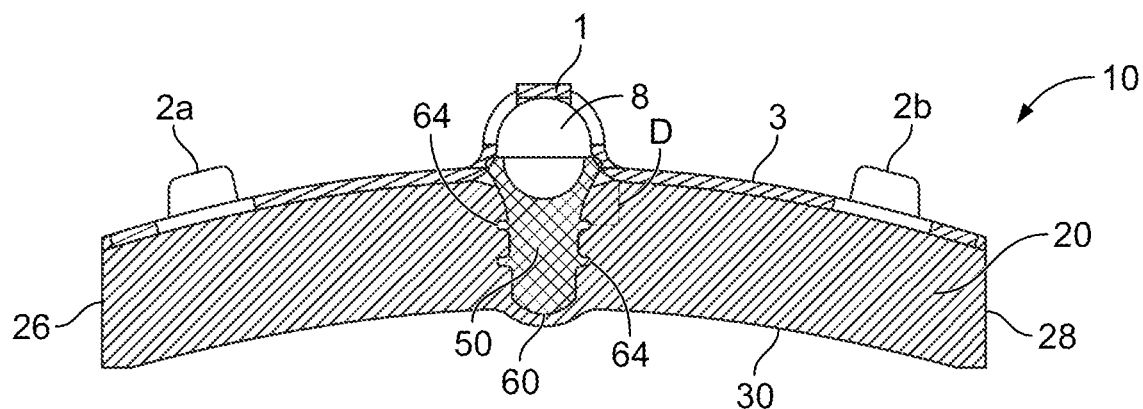
FIG. 7A is a cross-sectional view of the friction device shown in FIG. 6 along line A-A in FIG. 6 and having one example of a conditioning insert.

As shown in FIG. 8, the conditioning surface can extend generally between the flange side and the rim side of the composition friction material. FIGS. 7A through 8 show the conditioning insert encapsulated by the composition friction material and the conditioning surface covered by the composition friction material. In this instance, over repeated uses of the friction device, the composition friction material may wear away and eventually expose the conditioning surface. The conditioning surface may be flush with the brake surface and exposed to the rotating prior to the first use of the friction device in one example. Alternatively, the conditioning surface may be disposed within the friction material and not exposed or flush with the brake surface of the friction material.

The conditioning insert may be coupled with a backing plate. As one example, the insert may be welded to the backing plate (e.g., MIG welding, tig welding, arc welding, spot welding, laser welding, etc.). As another example, the conditioning insert can be coupled with the backing plate using a snap-in or snap fit connection with the insert being pushed into the backing plate and locked in. As another example, the backing plate and conditioning insert may be formed as a single body. Optionally, the conditioning insert can be cast around a steel plate or wire form, or the conditioning insert may be press fit into the backing plate. In one embodiment, a structural adhesive may be used to attach the conditioning insert to the backing plate.

Suitable backing plates may be made of metallic material or non-metallic material, or a combination or composite material. In one embodiment, the backing plate may be made of metallic material. Suitable metallic materials may include iron and iron alloys. Suitable iron alloys may include steel. In other embodiments, the backing plate may be made of reinforced composite materials. The backing plate may be coated. Suitable coatings may include galvanic coatings (particularly if the backing plate is formed of a corrodible metal), paint, and anodized layers. Suitable paints include enamel, epoxy, and powder coatings.

The backing plate may be curved axially to follow the curvature of the surface or tread of the rotating part. The axis for the curve may be a rotating part axis or wheel axis. In one embodiment, the friction structure may be curved and may be coaxial to the rotating part or the wheel, while the backing plate follows the curve of the friction structure to be coaxial to the rotating part or wheel. In another embodiment, the backing plate may be curved but is not coaxial with the wheel or with the working surface of the friction structure. The degree of separation of the curvature of the backing plate relative to the friction structure may be selected based on application specific parameters.

The backing plate may have surfaces that are relatively smooth and may have one or more defined apertures therethrough and/or protrusions extending therefrom. In one embodiment, the backing plate may be undulate increase the surface area that contacts the friction material. This increased surface area may provide more bonding surface to which the friction structure may bond. The undulations may be dispersed evenly across the backing plate or may be patterned so that some undulations are at a proximate edge or some undulations are concentrated nearer the center line. The undulations may run the length of the backing plate or may be oriented width-wise. Undulations may impart stiffness in the direction of their run, and flexion perpendicular to their run. In one embodiment, the undulations direction may be skew relative to the length and the width of the backing plate. In one embodiment, a checkered pattern or equivalent may be present to allow for control over the stiffness and the flexion of the backing plate while still increasing the surface area. Various patterns and similar effects can be created by selecting either a uniform thickness of the backing plate (and thus by bends in the plate) or by using non-uniform thicknesses across the backing plate.

In one embodiment, the width of the backing plate may be the same as the width of the friction structure. In another embodiment, the width of the backing plate differs from the width of the friction structure. The width may be the dimension extending from the rim side or flange side to the other of the flange side or the rim side (in a direction that is perpendicular to one or both of the rim side and the flange side). The backing plate having a width that is narrower than the width of the friction structure may be sufficient to perform the support function of the backing plate, while reducing overall weight and/or cost. A backing plate that is wider than the width of the friction structure may be sufficient to perform the support function of the backing plate, while providing enhanced support to edges of the friction material. In one embodiment, a ratio of the width of the backing plate to the width of the friction structure, a ratio of the length of the backing plate to the length of the friction structure, and/or a ratio of the thickness of the backing plate to a starting or initial thickness of the friction structure can be independent of each other and in a range of less than about 0.5, in a range of from about 0.6 to about 0.9, about 1, in a range of from about 1.1 to about 1.2, in a range of from about 1.2 to about 1.5, or in a range of greater than about 1.6. The lengths may be measure along the curvature or curved shapes from one longitudinal end to the opposite longitudinal end, and the thicknesses can be measured along radial directions extending from the braking surface or side and to the opposite surface or side. Suitable backing plate configurations may include a full unbroken plate, a mesh, a wire form, a reinforced wire form, a mesh, or a molded composite.

In one embodiment, the width of the friction material relative to the tread of the rotating part (which may include at least a portion of the flange that touches the friction device during use) may be in a range of less than about 35%, in a range of from about 36% to about 50%, in a range of from about 51% to about 75%, in a range of from about 76% to about 100%, or greater than about 101%. A suitable width of the friction device may vary from side to side or from end to end. A suitable shape of the friction structure may follow a contour of wheel, having a matching complimentary profile. This shaped edge may be formed with one or more of a chamfer, ridge, edge, or radius. In one embodiment, only one edge of the friction device may be contoured. In another embodiment, both edges are contoured to allow for installation in either orientation. In one embodiment, the friction device may fit to a new rotating part. A new rotating part may have a diameter in a range of less than about 600 mm, in a range of from about 601 mm to about 1300 mm, or in a range of greater than about 1301 mm.

The manufacture of the backing plate may be accomplished using casting or metal stamping, or even machining. In one embodiment, the backing plate may be manufactured using additive technology. Using additive technology, various components may be produced together as a single monolithic structure. Accordingly, the rejection lug, the key bridge, and the conditioning insert can be created along with the backing plate as a single seamless piece.

An example of a suitable friction structure or friction composition material may be a brake pad. The brake pad may be useful to slow or stop a vehicle. Suitable vehicles may include automobiles, trucks, buses, mining equipment, aircraft and railway vehicles. Railway vehicles may include locomotives and railcars and may be for transport of freight and/or passengers. The friction structure may be formed of a composition friction material. Embodiments of the invention may be suitable for use with locomotives, other railway vehicles, or other vehicles. In other embodiments, the use is suited for automobiles, buses, trucks, agricultural equipment, mining equipment, and the like.

In one embodiment, a suitable friction material may be rated for a rubbing pressure (RP) in a range of less than about 800 N/cm2, in a range of from about 801 N/cm2 to about 1000 N/cm2, in a range of from about 1001 N/cm2 to about 1500 N/cm2, or greater than about 1501 N/cm2. In one embodiment, a suitable friction material may be rated for a rubbing speed (RV) in a range of less than about 20 m/s, in a range of from about 21 m/s to about 30 m/s, in a range of from about 31 m/s to about 50 m/s, or greater than about 51 m/s. In one embodiment, a suitable friction material may be rated for continuous temperature operation (CT) in a range of from about 300° C. to about 350° C., from about 351° C. to about 400° C., from about 401° C. to about 450° C., or greater than about 451° C. In one embodiment, a suitable friction material may be rated for short term temperature (ST) in a range of from about 500° C. to about 600° C., from about 601° C. to about 700° C., from about 701° C. to about 800° C., from about 801° C. to about 900° C., or greater than about 901° C. The preceding ranges may be based at least in part on, and determined by, the friction material selection, the physical configuration, and the end use application of the friction device.

In other embodiments, a suitable friction structure may include a semi-metallic material. Semi-metallic may include a non-metallic matrix, such as a ceramic or a polymer, with a metallic filler. For example, a semi-metallic puck of iron or copper powder may be bound together by a ceramic or polymer. The fill content may be selected based at least in part on the desired performance of the friction material and friction structure made therefrom. Suitable filler content may be expressed as a ratio of metallic material to matrix material by volume or by weight. In various embodiments, a suitable ratio may be in a range of less than 50% by weight, in a range of from about 51% to about 75% by weight, from about 76 to about 90% by weight, or greater than 91% by weight. For example, a suitable formulation may be 90 grams of metal per 10 grams of matrix. In various embodiments, the fill content for the friction structure may be metal, as disclosed, a non-metal, or a combination of metal and non-metal materials.

The ceramic/iron materials may be mixed, compressed and/or sintered at a high temperature to form a solid friction structure. Suitable binding or matrix materials may include one or more of resin (such as phenol formaldehyde), graphite (which can serve as a friction material, zirconium silicate and the like. An example formulation, including binder, is shown in Table 1.

| Constituent | Approx. range % by weight |
|---|---|
| Aluminum Silicate | 25-35 |
| Bronze particles | 10-20 |
| Graphite | 5-15 |
| Vermiculite | 10-20 |
| Phenolic resin | 10-20 |
| Steel fibers | 3-7 |
| Rubber particles | 3-7 |
| Silicon dioxide particles | 1-5 |
| Aramid fibers | 1-5 |

The powder size, fiber size, concentration distribution, grain size distribution, and morphology may be selected or controlled to affect performance of the friction structure. If the fill content is a powder, suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples, the greater the surface area of the particle, the lower the friability of the friction structure; and in other examples, the more edged particles provide relatively more aggressive friction and conditioning than the smoother or rounder particles. The hardness of the material selected as the filler powder, in combination with the filler content, and particle morphology can contribute to the performance of the friction structure. If the fill content is a fiber, the fiber thickness and fiber length may be selected or controlled to affect performance. The fiber may be the same material as the powder fill content, and the fill content may be a mixture of powder and fiber in one embodiment. Other suitable fibers may be formed from an aromatic polyamide or aramid, such as Kevlar™, Twaron™, Nomex™, and Technora™. Other suitable fibers may be formed from an aliphatic or semi-aromatic polyamides, such as Nylon™. Polymeric fibers may include one or more copolymers to control and affect crystallinity, melting or softening points, and the like. The length of the fibers may be controlled to affect performance. Suitable fiber lengths may be in a range of less than about 1 millimeter (mm), in a range of from about 1.1 mm to about 2 mm, in a range of from about 2.1 mm to about 5 mm, or in a range of greater than about 5.1 mm. Fiber thickness may be selected to control and affect performance. Suitable fiber thickness may be in a range of from about In one embodiment, the fibers have a Denier in a range of less than about 20 d, in a range of from about 21 d to about 100 d, in a range of from about 101 d to about 500 d, in a range of from about 501 d to about 1500 d, in a range of from about 1501 d to about 3000 d, or greater than about 3000 d selected based at least in part on application specific parameters.

Suitable polymer or polymeric matrices may include phenolics, urea-formaldehyde, epoxy, cyanate ester, aromatic heterocyclics (such as Polyimides, polybenzoxazoles (PBOs), polybenzimidazoles, and polybenzthiazoles (PBTs)), inorganic and semiorganic polymers (such as may be derived from silicon-nitrogen, boron-nitrogen, and phosphorus-nitrogen monomers), and silicon-based polymers, as well as mixtures and copolymers of the foregoing. The polymeric matrix, along with other additives, may include a flame retardant. Suitable flame retardants may include a composition having one or more of aluminum, phosphorus, nitrogen, antimony, chlorine, bromine, and in some applications magnesium, zinc, and carbon.

In one embodiment, the friction material is a relatively low-dust producing material. Suitable low-dust friction materials may ablate in a controlled fashion to create particulate matter of determined size and/or morphology.

A suitable friction structure may be affixed to and extends from the backing plate along the surface opposite the rejection lugs and key bridge. In one embodiment, to be affixed to the backing plate the friction structure may include an adhesion layer (not shown) to facilitate proper fixture to the backing plate. In one embodiment, the friction material may be affixed via mechanical means with, or without, an adhesive layer. The friction structure may be affixed to the backing plate by means that may be selected based at least in part on the application specific parameters.

A suitable friction structure may include an outer layer that may be the first to contact a wheel surface when newly installed. This outer lay may perform one or more of the following functions: prevent exposure of the friction material during storage, transport or installation to corrosion, chipping, moisture, or fouling; provide an initial coating to the rotating part surface on the first few rotations after installation and braking to condition or treat the rotating part surface; to condition the rotating part surface and remove any debris or corrosion; to fill in cracks, pits, and defects in the rotating part surface; and the like. In one embodiment, the outer layer may be removed from the working surface of the friction structure through friction in the first few rotations during braking after installation. In one embodiment, the outer layer may be peeled off after installation or a part of the installation process.

The friction structure may include one or more wear indicators. In one embodiment, the wear indicators are molded into the friction material of the friction structure. A suitable location for the wear indicator may be at the back of the friction device. The backing plate may form the wear indicator or may have material removed to allow a wear indicator to be visible. Other suitable locations for wear indicators may include proximate to an end, around a periphery, at the centerline of the friction structure, at a distal end (or both ends) of the friction structure, as a part of a conditioning insert, or the like. During use, the wear indicators allows an observer to determine a useful life of the friction structure. In one example, the wear indicator may include a groove, marking, protrusion, or the like (or a combination of two or more of these items), formed in the friction material from the working surface down to a determined depth. During use, the depth of the groove may diminish, the mark may become less visible, the protrusion may become smaller, or the like, as the working surface of the friction material may be worn away. An observer may then look for the wear indicator(s) and determine or estimate a remaining useful life of the friction material based on how much of the wear indicator(s) is or are left (e.g., by the remaining depth of the groove, the remaining portion of the mark, the remaining part of the protrusion, etc., or the absence of any of these if the friction material is at the end of life and completely worn away). Other examples of wear indicators may include a differently colored portion of the friction structure. Or the conditioning insert may itself perform the wear indicator function. For example, the conditioning insert may wear away the more the friction material wears away.

In one embodiment, a radio frequency identification (RFID) chip (or equivalent) can be disposed in the friction material at a depth for which the end of life is set for the friction material. When the friction material is worn to expose the RFID chip, the chip may no longer function to provide a signal in response to a query (for passive chips, active chips may broadcast signals and the absence of a broadcast signal would indicate end-of-life). An RFID sensor or interrogator may communicate with the RFID chip and thereby one could determine when a change of the friction material or the friction device is needed.

The material of the conditioning insert and other parameters may be selected with reference to the conditioning function and the friction material may be selected with reference to the braking or friction function. Thus, the conditioning insert and the friction material may contain similar or the same materials in some embodiments, but the compositions may differ such to perform the intended functions of the conditioning insert and the friction material. This difference may be substantial (e.g., a metal conditioning insert within a composite friction structure) or may be relatively subtle (e.g., both are ceramic iron metal-filled structures, with one having a different concentration of metal content). In one embodiment, the conditioning insert may be formed of a material relatively harder and/or more abrasive than the friction structure. For example, the wheel conditioning insert may be formed of a material with suitably abrasive properties for the wheel conditioning insert. As the friction material may be applied to the surface of a wheel by contacting the surface, the wheel conditioning insert rubs against the wheel surface. The abrasive properties of the insert work to condition the wheel surface to prevent, reduce, or remove defects.

A suitable conditioning insert may be formed from a relatively hard material. Suitable materials may be metallic materials. Suitable metals may include one or more of Al, Si, P, S, Cl, Ti, V, Cr, Mn, Fe, Co, Ni, Cu, Zn, Mo, Sn, Sb, Tl, and oxides, carbides, and alloys of the foregoing. In one embodiment, the metal may be iron or an iron alloy. Suitable iron, and iron alloys, may include those as used in, and process to form, cast iron, forged iron, wrought iron and the like. Suitable cast iron may include malleable cast iron or ductile cast iron. Other suitable iron inserts include treated iron, regardless of its manufacturing process. Suitable treated irons may include phosphated iron, nitrided iron, heat treated iron, and the like. Some steels may be used in various embodiments. The steel may have controlled amounts of carbon and/or chromium, as well as a controlled ratio of martensite relative to cementite structure. Selecting the alloy content may control the hardness, and therefore the performance of the conditioning insert. In other embodiments, the conditioning insert may include a non-ferrous metal.

In other embodiments, a suitable conditioning insert may include a non-metallic matrix, such as a ceramic or a polymer. In one embodiment, it comes with a metallic filler. For example, a puck of iron powder or iron filling filled ceramic may be used. The iron may be the same, or different, from the identified suitable iron types. The fill content may be selected based at least in part on the desired performance of the conditioning insert. Suitable filler content may be expressed as a ratio of metallic material to matrix material by volume or by weight. In various embodiments, a suitable ratio may be in a range of less than 50% by weight, in a range of from about 51% to about 75% by weight, from about 76 to about 90% by weight, or greater than 91% by weight. For example, a suitable formulation may be 90 grams of iron powder per 10 grams of ceramic matrix. The ceramic/iron materials may be mixed, compressed and sintered at a high temperature to form a solid conditioning insert. The powder size and grain size distribution may be controlled to affect performance, as well. Suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the conditioning insert; and in other examples, the more edged particles provide relatively more aggressive friction and conditioning than the smoother or rounder particles. The hardness of the material selected as the filler powder, in combination with the filler content, and particle morphology can contribute to the performance of the conditioning insert. In one embodiment, the wheel conditioning insert may be formed of a material relatively harder and/or more abrasive than the friction material. For example, the wheel conditioning insert may be formed of a material with suitably abrasive properties for the wheel conditioning insert. As the brake shoe may be applied to the surface of a wheel, the wheel conditioning insert rubs against the wheel surface. The abrasive properties of the insert conditions the wheel surface to prevent, reduce, or remove defects.

Although various conditioning inserts are shown, other embodiments may have a different number (e.g., more or fewer) of conditioning inserts utilized along the rim side that may be determined with reference to application specific parameters. Further, in other embodiments, these inserts may have a shape other rectangular and selected to condition the wheel rim. Other suitable shapes may be selected with reference to the desired performance, but polygonal and ovoid shapes may be broadly useful across use types. The conditioning surface may remove imperfections from the rotating part when in use and/or may impart a coating layer on the subsequently conditions surface. The shape of the insert, the number of inserts, the insert material, and other factors (such as volume, weight, density, and end use application) may be selected to achieve a desired and proportional effect from the insert.

Additional features of the conditioning insert to facilitate the mechanical bonding of the insert to the composition friction material of the friction device will now be described. These features may help to improve the shear and pull-off strength required to separate or loosen the conditioning insert from the composition friction material. These bonding features may help to mitigate cracking in the composition friction material nearest the conditioning insert.

As shown in FIGS. 8 and 9, a first example of the bonding features in the conditioning inserts may be one or more grooves or indentations 62 within the conditioning insert. (For clarity purposes, not all grooves may be labeled in the drawings). The grooves may extend along the lateral ends or sides of the conditioning insert. The grooves may be formed as linear recesses that are parallel to each other and that are oriented parallel to the wheel conditioning surface. Optionally, one or more of the grooves may not have a linear shape but may have a curved or undulating shape. In another example, one or more of the grooves may have a combination of linear and non-linear sections or segments. Each of the grooves can extend into the lateral side and may continuously extend from one longitudinal side to the other longitudinal side without extending into either longitudinal side. The grooves are shown as elongated recesses, but optionally may be formed as circular, oval, polygon-shaped, or the like, dimples.

The grooves can accept the composition friction material therein and improve the bonding characteristics between the composition friction material and conditioning insert along the lateral ends and/or longitudinal ends. This is shown in FIG. 8, where the composition friction material extends into conditioning insert in the space provided by the grooves.

As another example, as shown in FIG. 10, the grooves may further extend along one or both the longitudinal ends or sides thus improving the mechanical bonding characteristics along the longitudinal ends. For example, the grooves may extend into all the sides, while remaining parallel to each other. Each of the grooves may continuously extend through all the sides, including through the intersections or edges between neighboring pairs of the sides. Optionally, the grooves may extend through multiple, but not all, of the sides. The number of the sides of the conditioning insert that the grooves extend into may be selected to control adhesion or coupling between the friction material and the conditioning insert.

The grooves may extend along any end or combination of ends or sides of the conditioning insert. Suitable grooves may take a shape to accept the composition friction material therein and to facilitate improved bonding between the composition friction material and the conditioning insert. The grooves may have a length, width, or depth to accept at least some portion of the composition friction material therein. The grooves may be different from one another and need not be uniform in shape or organization along the conditioning insert. For example, the grooves may be organized in columns as shown in FIGS. 9 and 10. However, the grooves may be staggered, disposed vertically within the conditioning insert (e.g., be elongated in directions that extend toward and away from the backing plate instead of directions that are parallel to the backing plate), or be randomly aligned along the sides.

The depth of the grooves may be the distance that the grooves extend into the side(s) of the conditioning insert. In one example, the groove depth may be significantly smaller than the thickness of the conditioning insert from the side that the groove is located to an opposite side of the conditioning insert (e.g., no more than 20%, no more than 10%, or no more than 5% of the thickness in different examples). Alternatively, one or more of the grooves may extend completely through the thickness of the conditioning insert from one side of the insert to the opposite side of the insert. For example, the grooves may be formed as conduits or tubes extending through the entirety of the thickness of the conditioning insert from one side of the insert to the opposite side of the insert.

Figure 12:
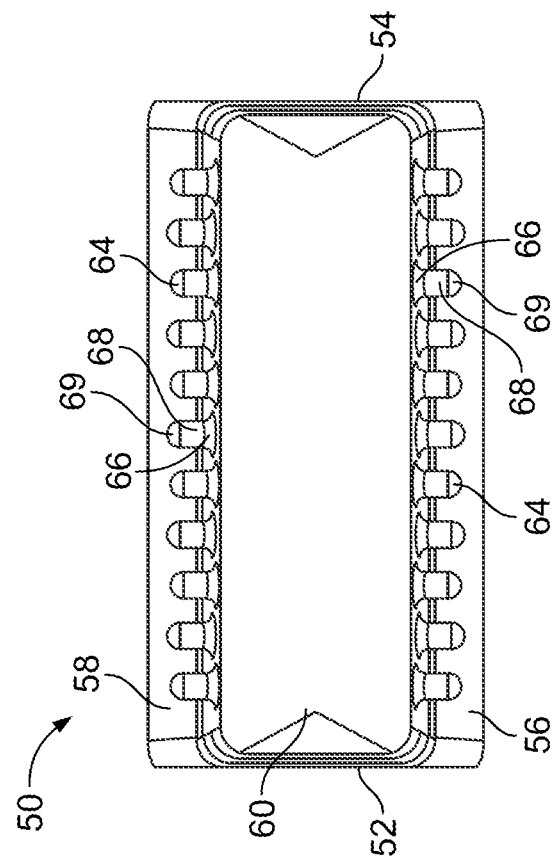
FIG. 12 is a bottom view of the conditioning insert shown in FIG. 11.
Figure 11:
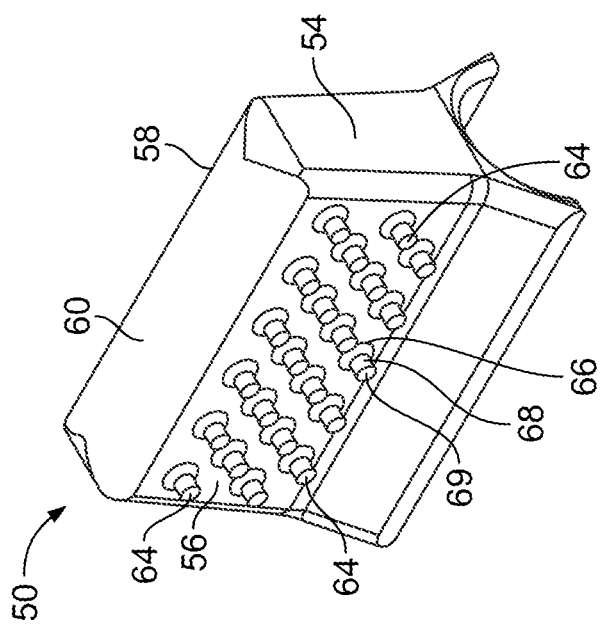
FIG. 11 is a perspective view of another example of a conditioning insert.

Referring now to FIGS. 7A, 7B, and FIGS. 11 through 14, another feature for improving mechanical bonding may include one or more protrusions 64, 70 extending from the conditioning insert. (For clarity purposes, not all protrusions are labeled in the drawings). The protrusions may be cantilevered beams (e.g., fins, columns (e.g., pins), or the like), extending from one or more sides of the inserts. As shown in FIGS. 11 and 12, the protrusions may extend from the longitudinal sides of the conditioning insert. As shown in FIG. 7A, the protrusions extend from the longitudinal sides and into the composition friction material. The protrusions may take the form of elongated columns or pins. The columns may include base portions 66 attached to and extending from the longitudinal sides, shaft portions 68 extending from the base portions, and head portions 69 extending from the shaft portions. Each of the columns or pins can be a peg with a cylindrical body with a rounded outer end. Optionally, the columns or pins may have a cylindrical shape, a square or rectangular cross-section, or another shape depending on the amount of coupling between the friction material and the conditioning insert that is desired. The columns may all protrude from the longitudinal side by the same distance so that all columns have an equivalent length (within manufacturing tolerances). Alternatively, some columns may have different lengths than other columns to control the adhesion or coupling between the conditioning insert and the friction material. The length of the columns may be short relative to the length and/or width of the conditioning insert. The extension of the columns into the composition friction material may serve to increase the pull-off or shear strength required to separate the composition friction material. While FIGS. 11 and 12 show the columns extending from the longitudinal sides of the conditioning insert, the columns may extend from the lateral sides alternatively or both the longitudinal and lateral sides. The columns may be organized into rows or columns across the ends of the conditioning insert, may be scattered about the ends, or may be organized in another manner.

Figure 7B:
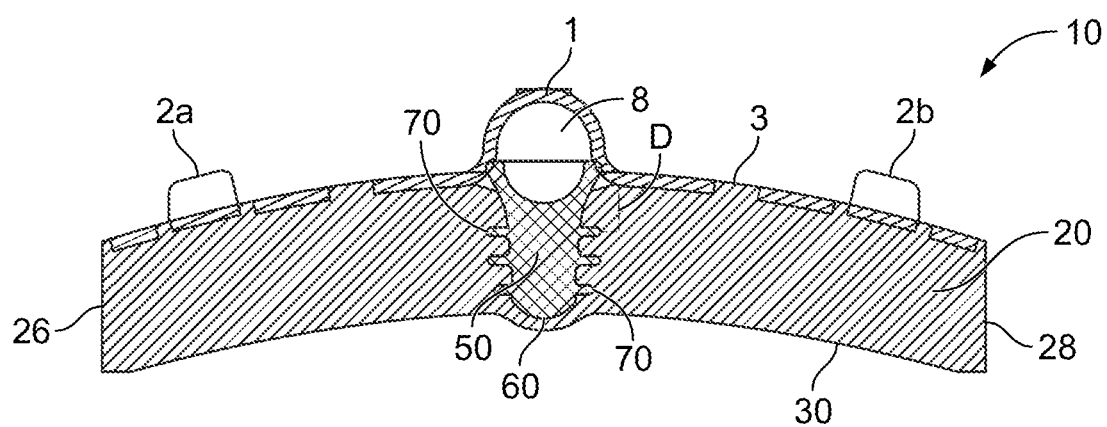
FIG. 7B is a cross-sectional view of the friction device shown in FIG. 6 along the line A-A in FIG. 6 having another example of a conditioning insert.
Figure 14:
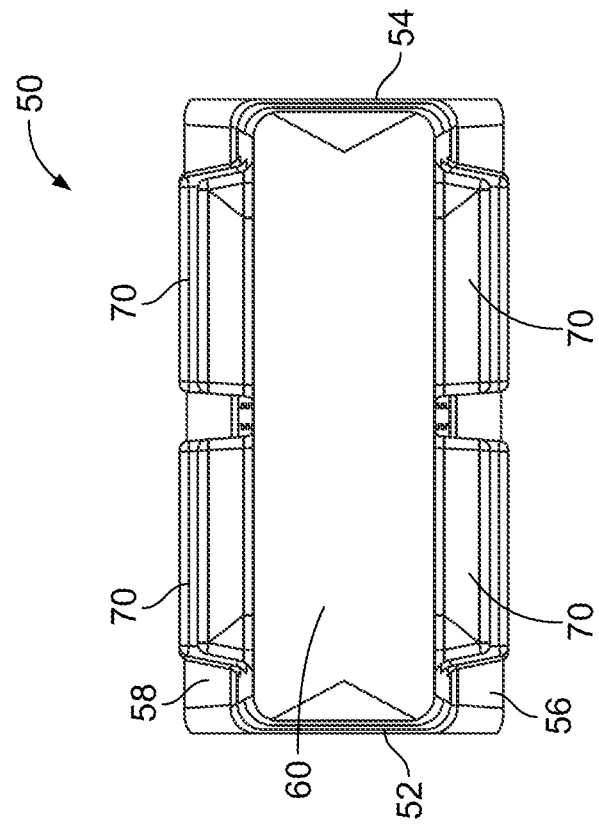
FIG. 14 is a bottom view of the conditioning insert shown in FIG. 13.
Figure 13:
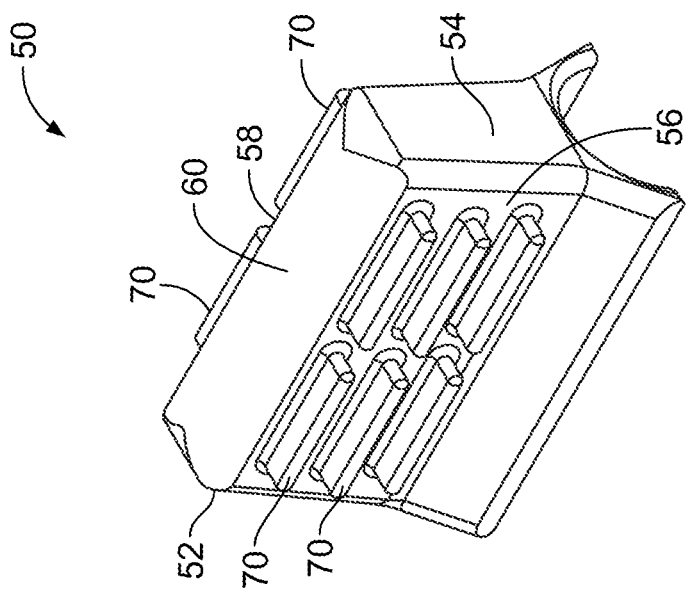
FIG. 13 is a perspective view of another example of a conditioning insert.

Referring now to FIGS. 13 and 14, the protrusions may take the form of elongated fins 70. Like the columns, the fins can extend into the composition friction material to improve the bonding characteristics of the composition friction material to the conditioning insert. As shown in FIG. 7B, the fins can extend from the longitudinal sides and into the composition friction material. Optionally, the fins can extend from the lateral sides and/or the longitudinal sides (and into the friction material). The fins may extend across an entire width of the longitudinal sides or, as shown in FIGS. 13 and 14, the fins may be organized into columns along the longitudinal sides. The fins may extend along the entire length of the sides, or the fins may be staggered. The fins may extend in a direction perpendicular to or be non-orthogonally angled to the side(s) from which they protrude. Different organizational styles (e.g., arrangements) of the fins may be used as well.

The fins can be planar bodies that are oriented parallel to each other. As shown, the fins may not extend along the entire width of the insert side. For example, each fin may extend along less than half the width of the insert side. Alternatively, the fins may extend along the entire width of the longitudinal side from one lateral side to the other lateral side and/or the entire width of the lateral side from one longitudinal side to the other longitudinal side.

The fins may have the same thickness or may have different thicknesses. The fins may have the same thickness from intersection locations where the fins contact the insert side to outer ends of the fins. Alternatively, the fins may have tapered shapes. For example, the fins may have larger thicknesses closer to the insert and smaller thicknesses farther from the insert. Optionally, the fins may have larger thicknesses farther from the insert and smaller thicknesses closer to the insert. The tapered shapes of the fins may assist with controlling and/or increasing adhesion between the friction material and the insert by forming wedge shapes of the friction material between the fins.

Figure 15B:
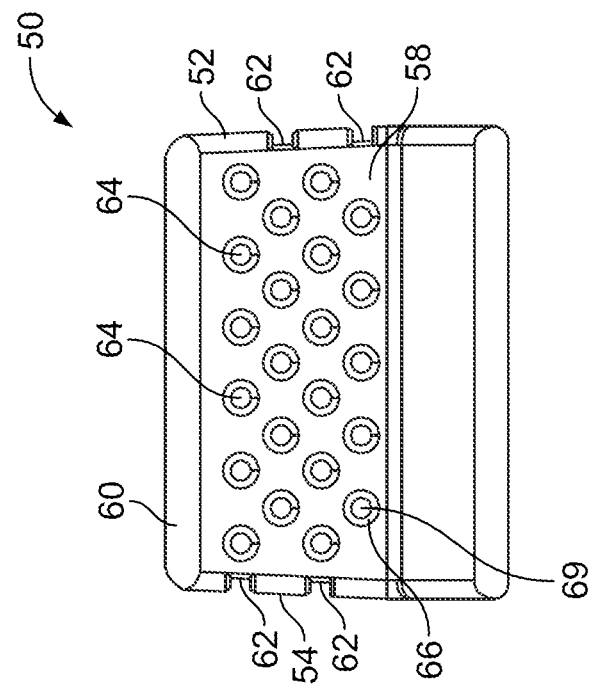
FIG. 15B is a side view of the conditioning insert shown in FIG. 15A.
Figure 15A:
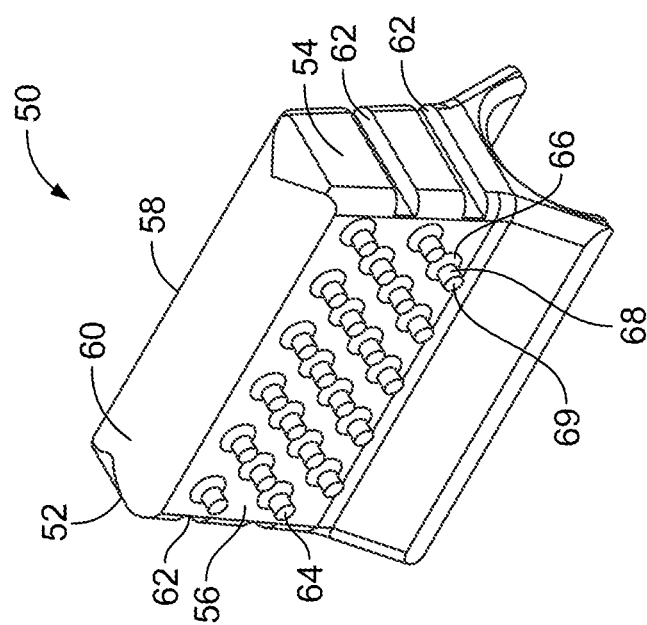
FIG. 15A is a perspective view of another example of a conditioning insert.
Figure 16B:
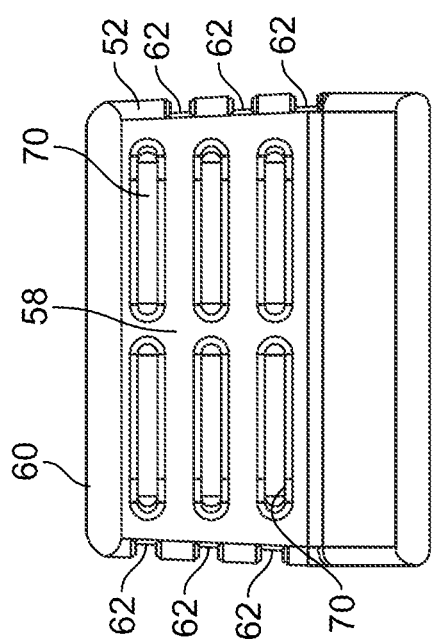
FIG. 16B is a side view of the conditioning insert shown in FIG. 16A.
Figure 16A:
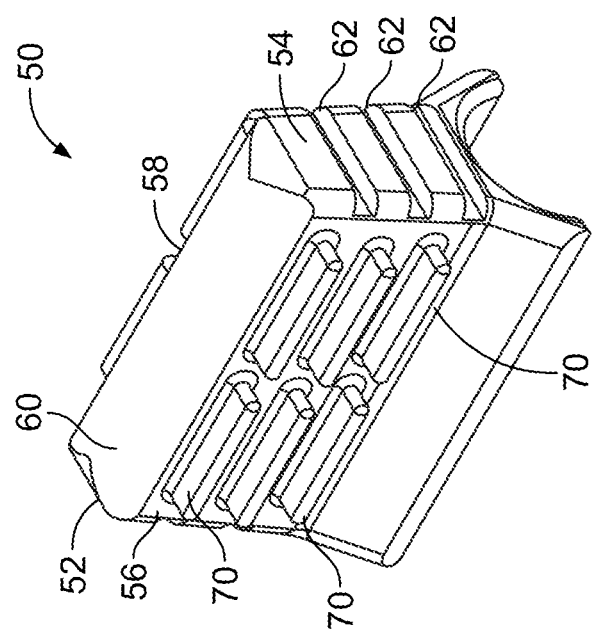
FIG. 16A is a perspective view of another example of a conditioning insert.
Figure 17:
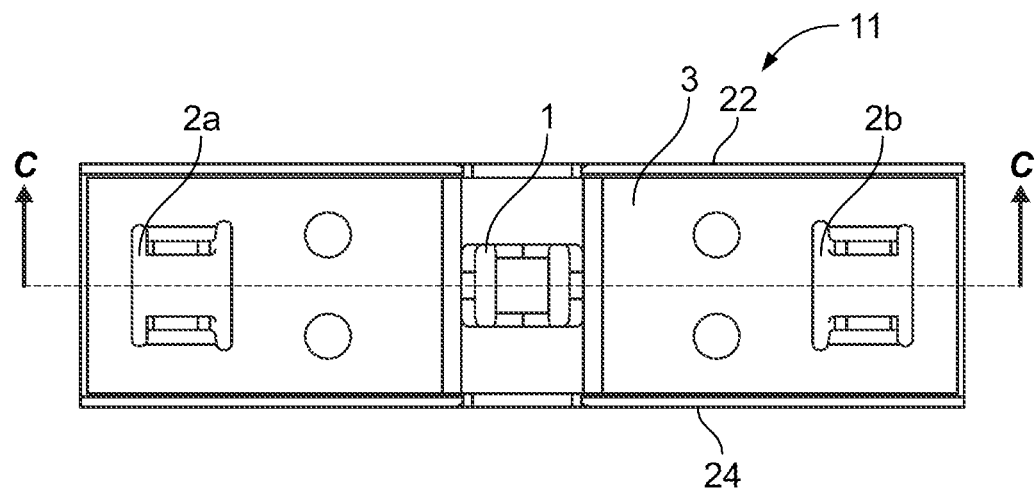
FIG. 17 is a top view of another example of a friction device.
Figure 18:
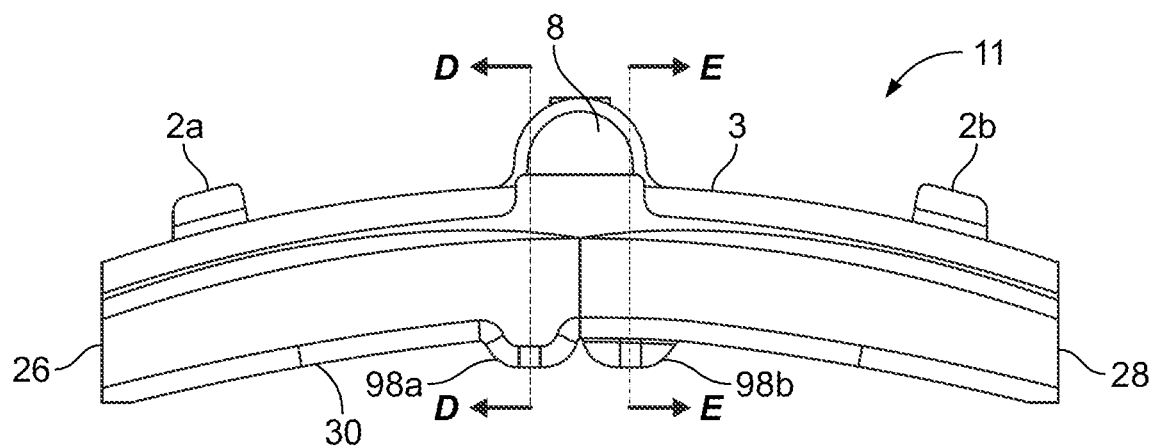
FIG. 18 is a side view of the friction device shown in FIG. 17.
Figure 19A:
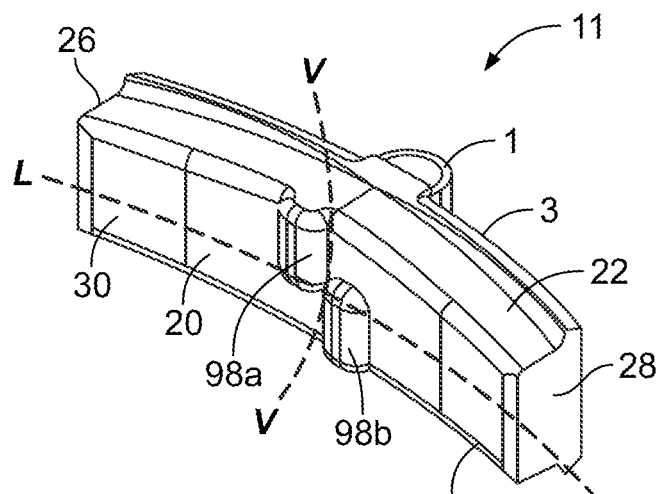
FIG. 19A is a perspective view of the friction device shown in FIG. 17.
Figure 19B:
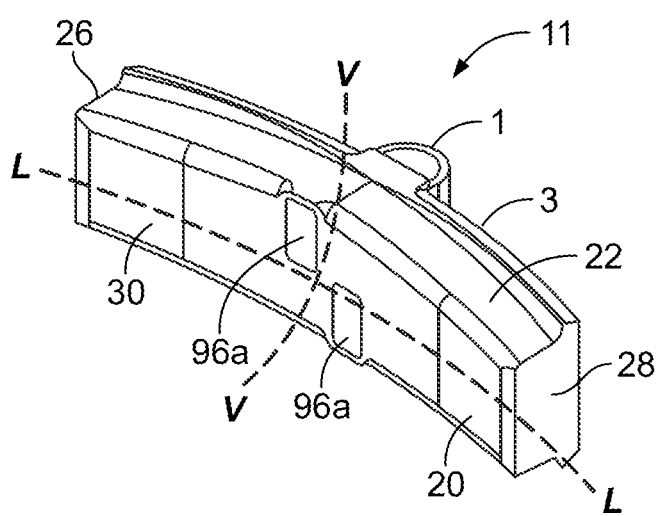
FIG. 19B is another perspective view of the friction device shown in FIG. 17.

As shown in FIGS. 15A through 16B, the grooves and protrusions may be used in combination with each other. In FIGS. 15A and 15B, the grooves extend along the lateral sides and the columns extend from the longitudinal sides. In FIGS. 16A and 16B, the grooves extend along the lateral sides and the fins extend from the longitudinal sides. Optionally, one or more sides of the insert may have both grooves and protrusions. Different organizational styles or arrangements of the protrusions and grooves may be used. For example, columns may extend from portions of the lateral sides not occupied by or having the grooves, and a combination of columns and fins may extend from the longitudinal sides. The grooves may extend along each side, and the fins may extend from portions of the sides unoccupied by the grooves. The organization of grooves and protrusions need not be symmetrical about the conditioning insert. For example, grooves may extend along the first lateral side but not the second lateral side. Columns may extend from the first longitudinal side but not the second longitudinal side. Another arrangement of protrusions and grooves may be utilized across any end or side of the conditioning insert.

Referring again to FIGS. 7A and 7B, the protrusions may be located at a point along the conditioning insert that is a distance D away from the backing plate of the friction device. This prevents the protrusions from interfering with the bonding of the backing plate to the composition friction material and ensures that the protrusions fully provide the improved mechanical bonding features between the composition friction material and the conditioning insert. While conditioning inserts have been shown with either column or fin protrusions, both may be used on an insert as well as other shapes to improve the bonding characteristics between the wheel conditioning insert and the composition friction material. The distance D may be longer than the distance between the grooves or between the protrusions to help ensure bonding between the insert and the backing plate.

Figure 20:
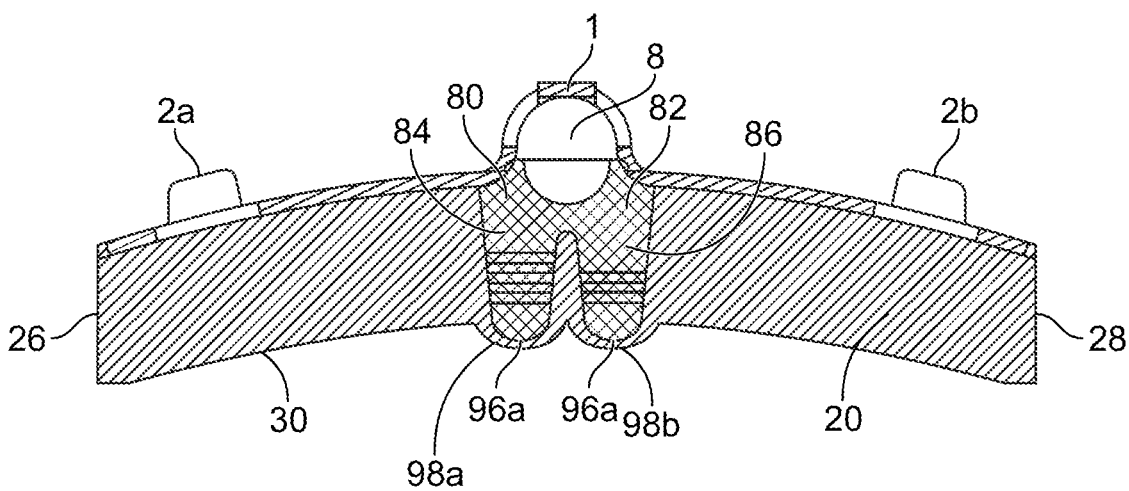
FIG. 20 is a cross-sectional view of the friction device shown in FIG. 17 along line C-C in FIG. 17.

Referring now to FIGS. 17 through 27B, another example of a conditioning insert 80 with improved mechanical bonding features is shown. FIGS. 17 through 21B show a friction device 11 with the conditioning insert disposed therein. The friction device has the same features as the friction device described above, with the addition of the conditioning insert creating extended portions 98a, 98a within the composition friction material. The extended portions can be larger protrusions (e.g., larger than the columns), such as bumps, undulations, bowed portions, or the like, that extend beyond the arcuate shaped brake surface of the friction device and being encapsulated by the composition friction material. As shown in FIGS. 19A and 20, the tread conditioning surfaces 96a, 96b extend beyond the arcuate shape of the brake surface forming the extended portions of the composition friction material and brake surface. However, the wheel conditioning surfaces may be worn down before or during use of the friction device to be flush with the brake surface, as shown in FIGS. 19B, 21A, and 21B.

Figure 22:
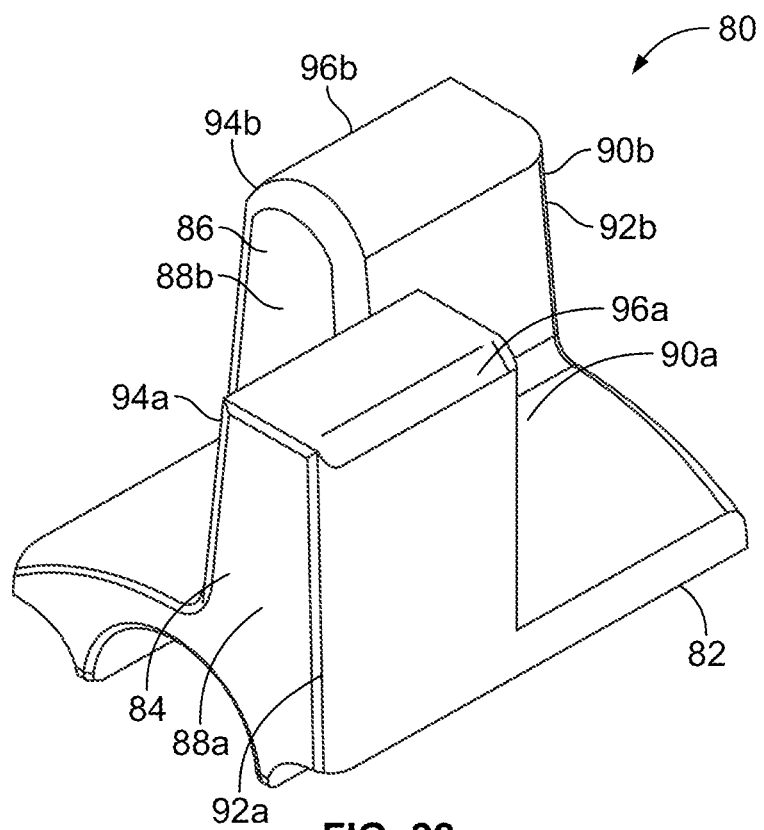
FIG. 22 is a perspective view of another example of a conditioning insert.

The conditioning insert disposed within the friction device is shown in FIG. 22. The conditioning insert may have a base portion 82. The base portion may be located within the composition friction material and near the backing plate. Two insert bodies 84, 86 extend from the base portion toward the brake surface. Each insert body has a first lateral end or side 88a, 88b, a second lateral end or side 90a, 90b, a first longitudinal end or side 92a, 92b, a second longitudinal end or side 94a, 94b, and the conditioning surface 96a, 96b. A longitudinal axis L, shown in FIGS. 19A and 19B, extends along the brake surface and substantially bisects the base portion of the conditioning insert. Optionally, the longitudinal axis may represent a circumferential direction that encircles the surface of the rotating part that may be contacted by the friction material of the friction device to slow or stop movement of the rotating part.

The insert bodies are laterally offset from the longitudinal axis L in opposite directions. Specifically, the first insert body may be offset from the longitudinal axis L so that the first insert may be adjacent or closer to the flange side of the composition friction material than the second insert, and the second insert body may be offset from the longitudinal axis L so that the second insert may be adjacent to or closer to the rim side. A lateral axis V, shown in FIGS. 19A and 19B, extends across the brake surface and substantially bisects the base portion between the opposite ends. The insert bodies may be longitudinally offset from the lateral axis V in opposite directions. Specifically, the first insert body 84 may be offset from the lateral axis V so that it may be closer to the first longitudinal end 26, and the second insert body 86 may be offset from the lateral axis V so that it may be closer to the second longitudinal end 28.

By having the insert bodies offset from both the longitudinal axis L and the lateral axis V, the friction device experiences improved manufacturing characteristics when molding the composition friction material around the conditioning insert. Specifically, the longitudinally and laterally offset insert bodies permit the composition friction material to flow around the conditioning insert and between the insert bodies during molding. This permits the composition friction material to be equally distributed around the conditioning insert and between the insert bodies in a uniform molding process. The equal distribution of composition friction material and the uniform molding process helps to make the composition friction material more resistant to cracking around the conditioning insert.

This configuration allows for the conditioning surfaces to condition a majority of the surface of the rotating part when the friction device may be applied to the rotating part. The configuration allows the composition friction material to fill the space between the offset insert bodies. This composition friction material generally takes the shape of a cross between the insert bodies. Because the composition friction material takes up this space, additional mechanical bonding benefits manifest between the composition friction material and the insert bodies. This results in a greater shear strength and reduction in cracking within the composition friction material in the areas surrounding the conditioning insert, especially in the areas around the insert bodies.

Figure 21A:
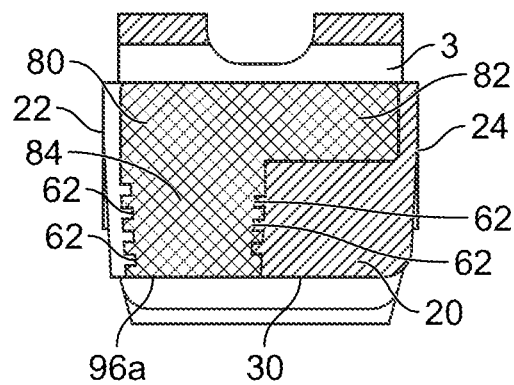
FIG. 21A is a cross-sectional view of the friction device shown in FIG. 17 along line D-D shown in FIG. 18.
Figure 21B:
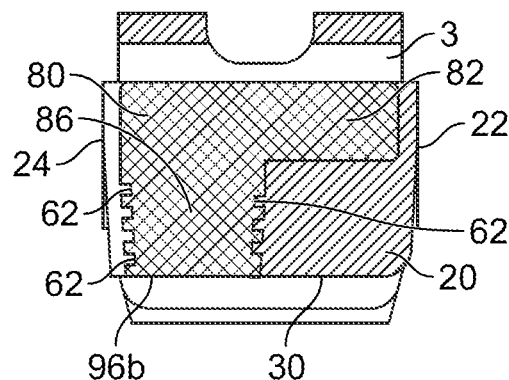
FIG. 21B is a cross-sectional view of the friction device shown in FIG. 17 along line E-E shown in FIG. 18.
Figure 23B:
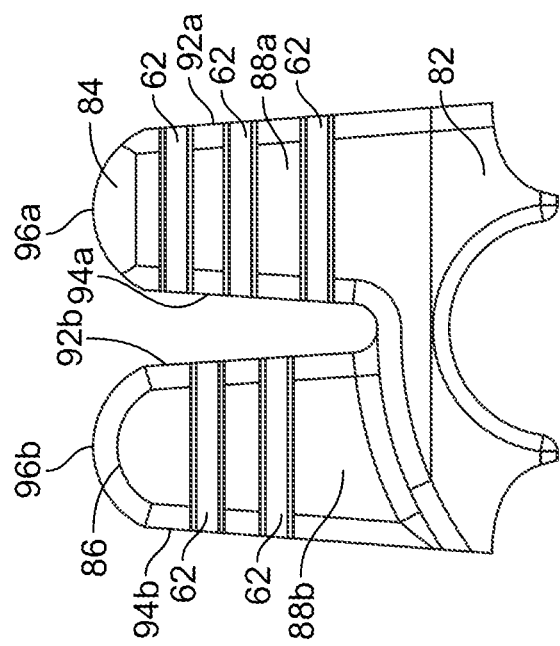
FIG. 23B is an end view of the conditioning insert shown in FIG. 23A.
Figure 23A:
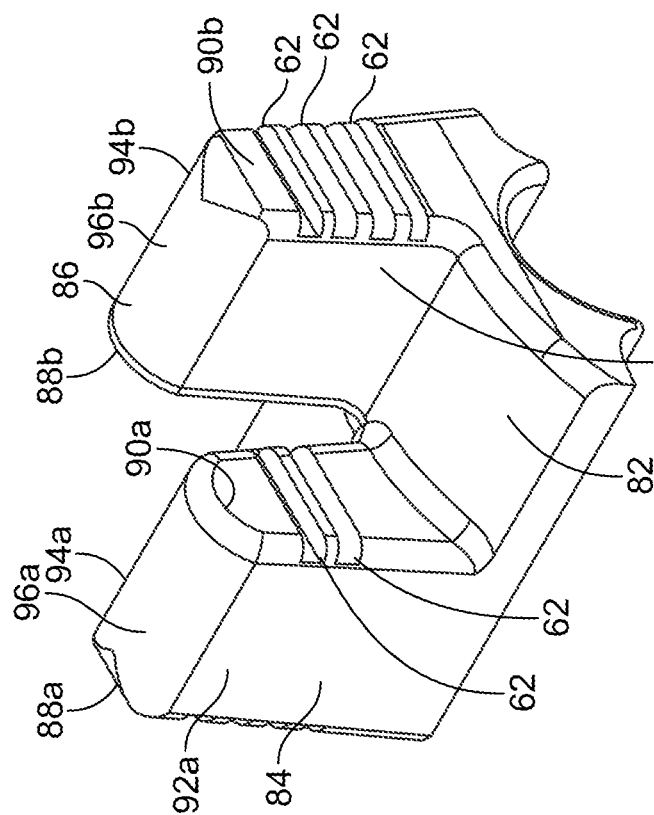
FIG. 23A is a perspective view of another example of a conditioning insert.

Like the conditioning insert described above, the insert bodies may include grooves and protrusions 64, 70 extending around their respective ends 88a, 88b, 90a, 90b, 92a, 92b, 94a, 94b. Referring now to FIGS. 23A and 23B, the conditioning insert may have grooves extend along the lateral ends of both insert bodies. The grooves accept the composition friction material therein and improve the bonding characteristics between the composition friction material and the conditioning insert along the lateral ends. This is shown in FIGS. 21A and 21B where the composition friction material extends into the insert bodies along their lateral ends in the space provided by the grooves.

The grooves may extend along the longitudinal ends of the insert bodies as well. This further improves the mechanical bonding characteristics of the conditioning insert along the longitudinal ends. The grooves may extend along every end 88a, 88b, 90a, 90b, 92a, 92b, 94a, 94b of the insert bodies, or the grooves may only extend along some of the ends. The organization of the grooves along the ends need not be symmetrical about the insert bodies. For example, the grooves may extend along the first lateral end 88a of the first insert body and the first longitudinal end 92b of the second insert body, but the grooves may not extend along the first lateral end 88b of the second insert body or the first longitudinal end 92a of the first insert body. The grooves may extend in a direction perpendicular to or angled to the direction shown in FIGS. 23A and 23B. The grooves may take any shape or size that may facilitate the acceptance of the composition friction material therein. Any number of grooves may be present about the insert bodies as well. In various embodiments, the grooves may take shapes different from one another, and need not be organized consistently about the ends. For example, the grooves may be organized into columns, as shown in FIGS. 23A and 23B, or the grooves may be staggered across the ends of the insert bodies.

As shown in FIGS. 24A and 24B, the column protrusions may extend from the longitudinal ends 92a, 92b, 94a, 94b.

Like the columns shown in FIGS. 11 and 12, the columns shown in FIGS. 24A and 24B may include a base portion 66 extending directly from the longitudinal ends 92*a*, 92*b*, 94*a*, 94*b*, a shaft portion 68 extending from the base portion 66, and a head portion 69 extending from the shaft portion 68. The length of the columns may be short relative to the length and/or width of the conditioning insert and the insert bodies. The extension of the columns into the composition friction material may serve to increase the pull-off or shear strength required to separate the composition friction material from the conditioning insert or vice versa. The increased pull-off or shear strength may lessen the likely hood of destabilization of the bonding between the composition friction material and the conditioning insert disposed therein.

While the columns are only shown on the longitudinal ends, the columns may extend from the lateral ends of the insert bodies as well. The columns may be organized in any manner about the ends of the insert bodies that will create the increased pull-off or shear strength required to separate the composition friction material from the conditioning insert. For example, the columns may be organized into rows or columns, or the columns may be scattered about the ends with minimal or reduced organization. Other organizational styles of the columns along the ends of the insert bodies may be used.

As shown in FIGS. 25A and 25B, the protrusions may take the form of elongated fins 70. The fins may extend into the composition friction material from the longitudinal ends to improve the bonding characteristics between the composition friction material and the conditioning insert as described above in connection with the columns. While the fins are only shown extending from the longitudinal ends, the fins may extend from the lateral ends of the insert bodies as well.

The fins may be organized along the ends of the insert bodies in another style that helps to facilitate the improved mechanical bonding features between the composition friction material and the conditioning insert described herein. For example, the fins may be organized in columns, as shown in FIGS. 25A and 25B, or the fins may be staggered. The fins may have different lengths along the ends of the insert bodies, or the lengths of the fins may be uniform. The fins may extend in a direction perpendicular or angled to the direction shown in FIGS. 25A and 25B. Another organizational style of the fins along the ends may be used as an alternate.

Figure 26B:
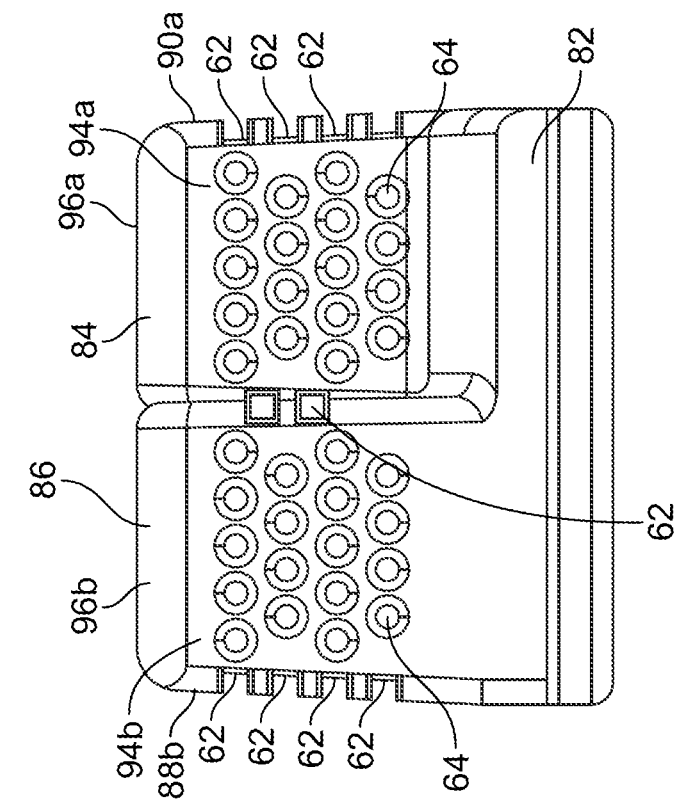
FIG. 26B is a side view of the conditioning insert shown in FIG. 26A.
Figure 26A:
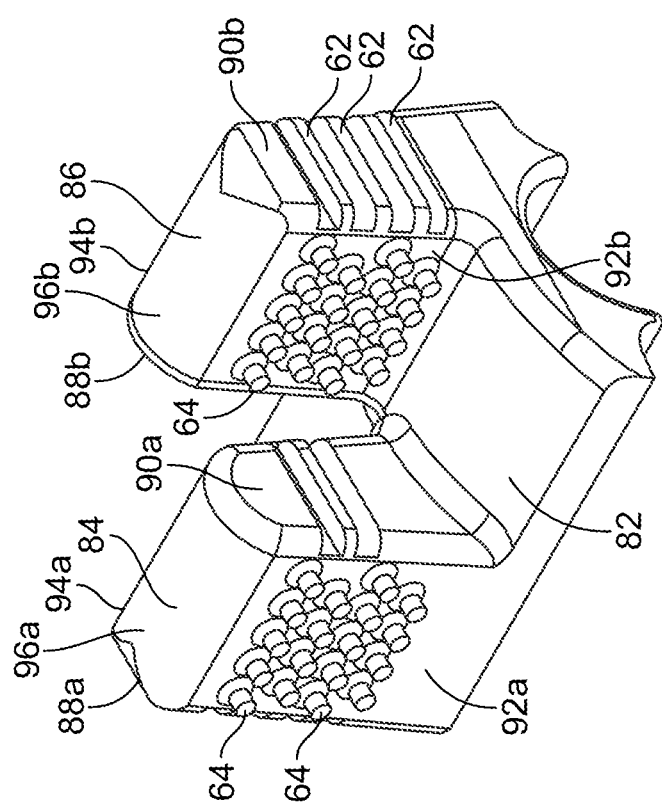
FIG. 26A is a perspective view of another example of a conditioning insert.
Figure 27B:
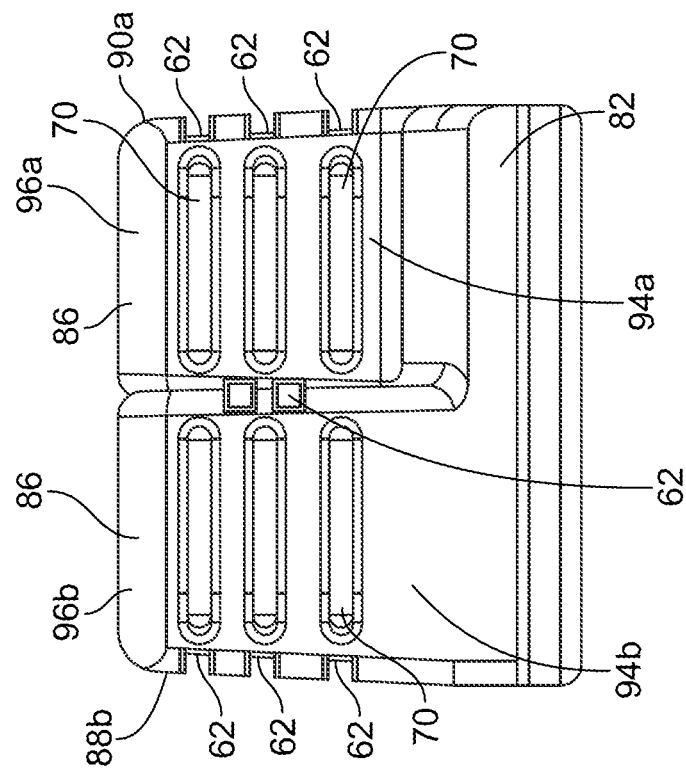
FIG. 27B illustrates another view of the conditioning insert shown in FIG. 27A.
Figure 27A:
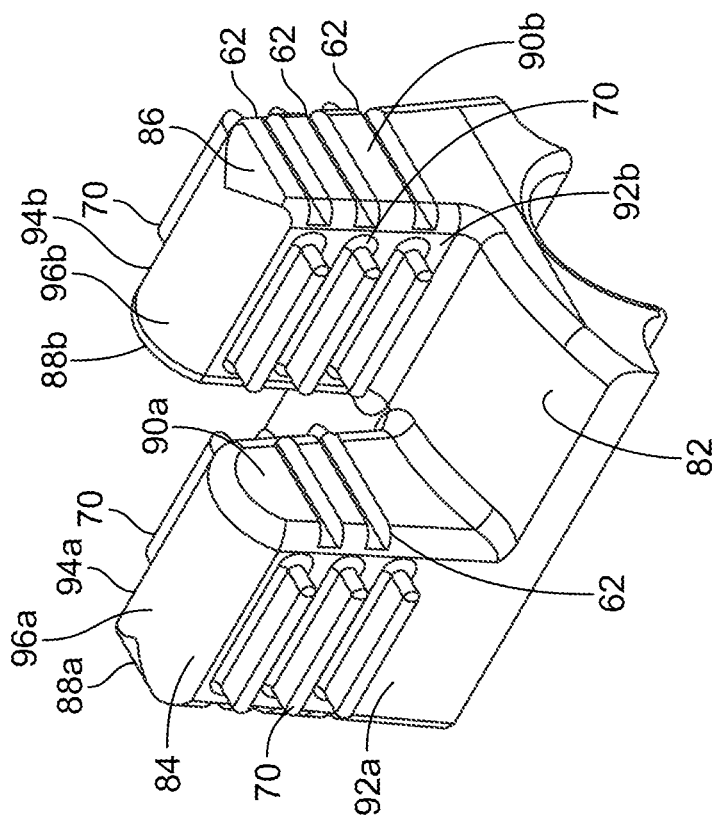
FIG. 27A illustrates another example of a conditioning insert.

As shown in FIGS. 26A-27B, the grooves and protrusions may be used in combination on the insert bodies. In FIGS. 26A and 26B, the grooves extend along the lateral ends of the insert bodies while the columns extend from the longitudinal ends. In FIGS. 27A and 27B, the grooves extend along the lateral ends while the fins extend from the longitudinal ends. Different organizational styles of the grooves and protrusions may be used. For example, columns may extend from the portions along the lateral ends unoccupied by the grooves. Combinations of columns and fins may extend from the lateral ends. The grooves may extend along each end with fins extending from portions of the ends unoccupied by the grooves. The organization of the grooves and protrusions need not be symmetrical with respect to the insert bodies. For example, grooves may extend along the first longitudinal end of the second insert body while fins may extend from the first longitudinal end of the first insert body. Optionally, another arrangement of the grooves and protrusions on the ends may be used.

Figure 28:
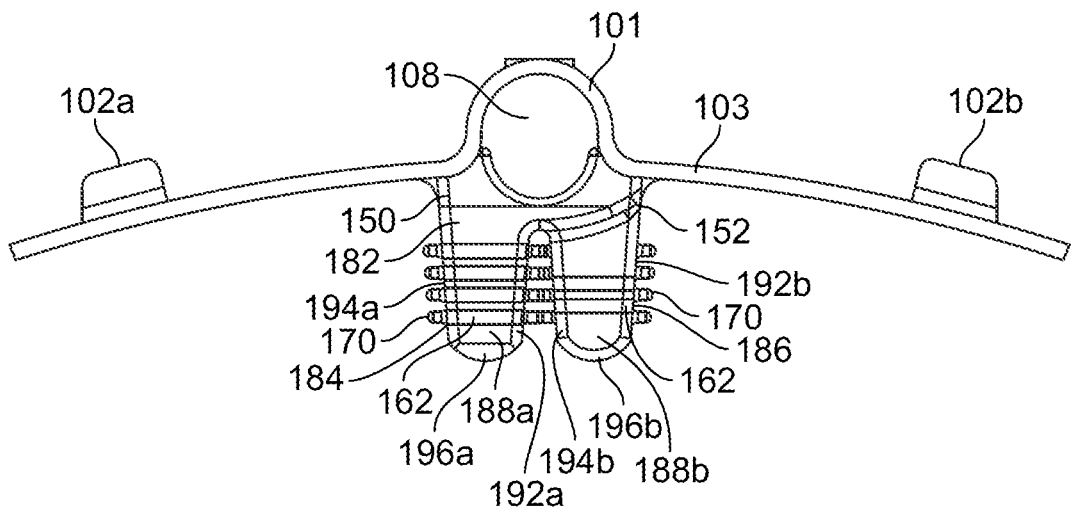
FIG. 28 is a side view of another example of a backing plate and conditioning insert.
Figure 29:
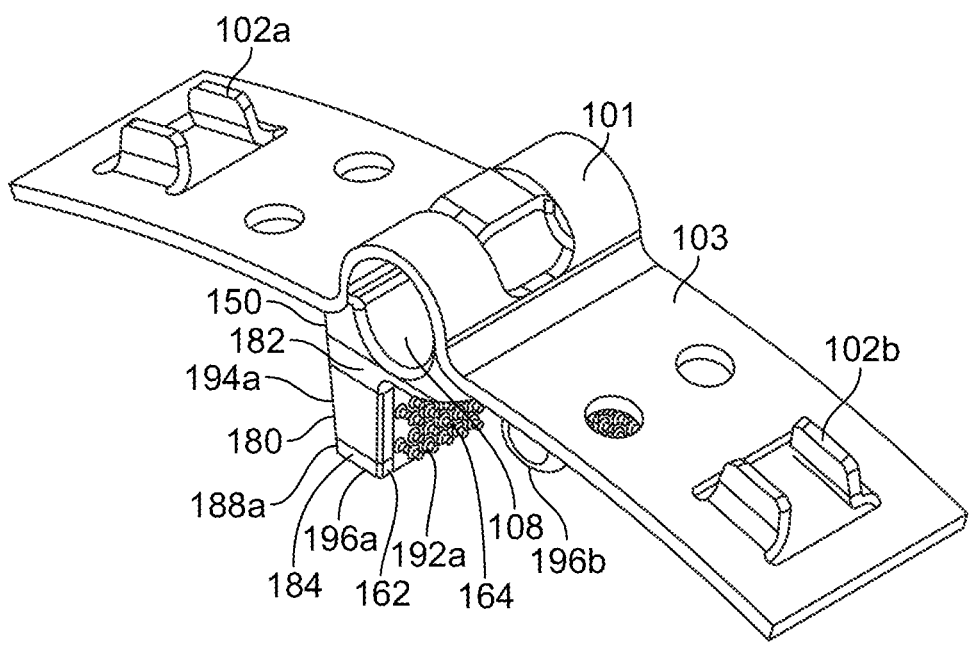
FIG. 29 is a perspective view of another example of a backing plate and conditioning insert.

Referring now to FIGS. 28 and 29, another embodiment of a conditioning insert 180 is shown. The conditioning insert may be integral with and extends from a backing plate 103. Like the backing plate described above, the backing plate may be made of metallic material such as iron or steel, but other reinforced composite materials may be used. The conditioning insert has linking portions 150, 152 to connect the conditioning insert to the backing plate. The backing plate, linking portions, and the conditioning insert may be made of the same metallic or composite material and be formed as one piece, or the components may be made of different metallic or composite materials and be fastened together. The wheel condition insert may be disposed within composition friction material (not shown), and the backing plate may be attached to the composition friction material. When fully assembled before use, a friction device having an integral backing plate and conditioning insert may look substantially similar to the friction device shown in FIGS. 17 through 19B.

The conditioning inserts shown in FIGS. 28 and 29 are examples. Another conditioning insert with or without the features described herein may be made integral with the backing plate as described in this embodiment. As shown, the conditioning insert may have a base portion 182 with two insert bodies 184, 186 extending therefrom. Each insert body has two longitudinal ends 188*a*, 188*b*, 190*a*, 190*b* and two lateral ends 192*a*, 192*b*, 194*a*, 194*b*. Like the conditioning insert described above, the insert bodies may have additional features such as grooves 162 and protrusions 164, 170 extending from respective ends 188*a*, 188*b*, 190*a*, 190*b*, 192*a*, 192*b*, 194*a*, 194*b*. As shown in FIG. 28, grooves extend along lateral ends 188*a*, 188*b* and fins extend from the longitudinal ends 192*a*, 192*b*, 194*a*, 194*b*. As shown in FIG. 29, the lateral end 188*a* of the first insert body may have grooves while the first longitudinal side 192*a* has a plurality of columns extending therefrom. As described above, any combination or organization of grooves and protrusions may be used on the ends of the insert bodies as necessary.

In another feature of the subject matter described herein, a friction device for use on a vehicle (e.g., a railway vehicle or other vehicle) may include a backing plate adapted to interface with a brake head of the vehicle, a composition friction material disposed onto the backing plate to form a brake surface of the friction device for engaging a wheel of the vehicle including two opposite lateral ends and two opposite longitudinal ends, and at least one tread conditioning insert disposed within the composition friction material including a wheel conditioning surface, a first opposite longitudinal side, a second opposite longitudinal side, a first opposite lateral side, and a second opposite lateral side. At least one convolution may be formed on at least one of the first opposite longitudinal side, the second opposite longitudinal side, the first opposite lateral side, or the second opposite lateral side such that a contact surface between the tread conditioning insert and the wheel changes as the tread conditioning insert wears away with contact with the wheel, thereby regenerating a surface of the wheel.

The tread conditioning insert may be formed of a material different than the composition friction material and may be metallic. At least one convolution may be formed on each of the first and second opposite lateral sides. The convolution may include at least one convex portion and at least one concave portion. The first and second opposite lateral sides of the tread conditioning insert may include at least one convolution, where each convolution may include at least one convex and concave portion. The convolutions of the first and second opposite lateral sides may include a plurality of alternating convex portions and concave portions.

The convolution may include a plurality of alternating convex portions and concave portions. The concave portions may have a larger width dimension than the width dimension of the convex portions. The friction device may comprise a key bridge connected to the backing plate and adapted to secure the friction device to a brake head of a railway vehicle. The tread conditioning insert may be connected to the key bridge. The key bridge may be formed integrally with the backing plate. The backing plate may comprise at least one opening and the key bridge may comprise at least one prong may engage the opening to secure the key bridge to the backing plate.

The brake surface may include a first portion with a first radius of curvature and a second portion with a second radius of curvature different from the first radius of curvature. The backing plate may be arcuate-shaped and comprises a convex side and a concave side. The wheel conditioning surface may be arcuate-shaped.

A method of forming a friction device for use on a vehicle may include providing a backing plate adapted to interface with a brake head of the vehicle and disposing a composition friction material onto the backing plate to form a brake surface for engaging a wheel of the railway vehicle. The composition friction material can include two opposite lateral ends and two opposite longitudinal ends. The method can include providing at least one tread conditioning insert within the composition friction material. The tread conditioning insert can include a wheel conditioning surface, a first opposite lateral side, a second opposite lateral side, a first opposite longitudinal side, and a second opposite longitudinal side. The convolution can be formed on at least one of the first opposite lateral side, the second opposite lateral side, the first opposite longitudinal side, or the second opposite longitudinal side, such that a contact surface between the tread conditioning insert and the wheel changes as the tread conditioning insert wears away with contact with the wheel (thereby regenerating a surface of the wheel).

The method can include forming the brake surface to comprise a first portion with a first radius of curvature and a second portion with a second radius of curvature different from the first radius of curvature. The method may include forming the convolution on the first opposite lateral side and the second opposite lateral side. The convolution may include at least one convex portion and at least one concave portion. The method may include forming the at least one convolution on the first opposite lateral side and the second opposite lateral side, where a plurality of alternating concave portions and one convex portion are formed on the first opposite lateral side and the second opposite lateral side.

A friction device for use on a vehicle can include a backing plate adapted to interface with a brake head of the vehicle, and a composition friction material disposed onto the backing plate to form a brake surface of the friction device for engaging a wheel of the vehicle. The composition friction material may have two opposite lateral ends and two opposite longitudinal ends. The friction device can include at least one tread conditioning insert disposed within the composition friction material and including a wheel conditioning surface, a first opposite lateral side, a second opposite lateral side, a first opposite longitudinal side, and a second opposite longitudinal side. At least one convolution may be formed on at least one of the first opposite lateral side, the second opposite lateral side, the first opposite longitudinal side, or the second opposite longitudinal side, such that a contact surface between the tread conditioning insert and the wheel changes as the tread conditioning insert wears away with contact with the wheel, thereby regenerating a surface of the wheel.

The tread conditioning insert can be formed of a material different than the composition friction material. For example, the tread conditioning insert can be metallic. At least one convolution can be formed on each of the first and second opposite lateral sides. The convolution can include at least one convex portion. The convolution can be formed on the first opposite lateral side and the second opposite lateral side and include a plurality of alternating convex portions and concave portions.

The convolutions can include a plurality of alternating convex portions and concave portions. The concave portions can have a larger width dimension than the width of the convex portions.

A suitable friction device can include a key bridge connected to the backing plate and adapted to secure the friction device to a brake head of the vehicle. The conditioning insert can be connected to the key bridge. In one embodiment, the key bridge may be formed integrally with the backing plate. The backing plate can include at least one opening and the key bridge can include at least one prong engaging the opening to secure the key bridge to the backing plate. The brake surface can include a first portion with a first radius of curvature and a second portion with a second radius of curvature different from the first radius of curvature. The backing plate can be arcuate-shaped and include a convex side and a concave side. The wheel conditioning surface can be arcuate-shaped.

A method of forming a friction device for use on a vehicle may include providing a backing plate adapted to interface with a brake head of the vehicle and disposing a composition friction material onto the backing plate to form a brake surface for engaging a wheel of the vehicle. The composition friction material may have opposite lateral ends and opposite longitudinal ends. The method may include providing at least one tread conditioning insert within the composition friction material. The tread conditioning insert may include a wheel conditioning surface, a first opposite lateral side, a second opposite lateral side, a first opposite longitudinal side, and a second opposite longitudinal side. At least one convolution may be formed on at least one of the first opposite lateral side, the second opposite lateral side, the first opposite longitudinal side, or the second opposite longitudinal side such that a contact surface between the tread conditioning insert and the wheel changes as the tread conditioning insert wears away with contact with the wheel, thereby regenerating a surface of the wheel.

The method can include forming the brake surface to include a first portion with a first radius of curvature and a second portion with a second radius of curvature different from the first radius of curvature. The method can include forming the convolution(s) on the first opposite lateral side and the second opposite lateral side. The convolution(s) can include at least one convex portion and at least one concave portion. The method optionally can include forming the convolution(s) on the first opposite lateral side and the second opposite lateral side, where a plurality of alternating concave portions and one convex portion are formed on the first opposite lateral side and the second opposite lateral side.

Unlike other friction devices, the inventive subject matter described herein results in a contact surface between the insert and a wheel tread that varies as the friction device wears. This permits regeneration of the surface of the wheel to occur at a pace that may be beneficial to both the wheel and the friction device. Furthermore, this results in improved bonding between the bonded insert and the friction material that makes up the friction device. Improved bonding results in a beneficial increase in the shear or pull-off strength required to separate or loosen the bonded insert from the friction material.

Figure 31:
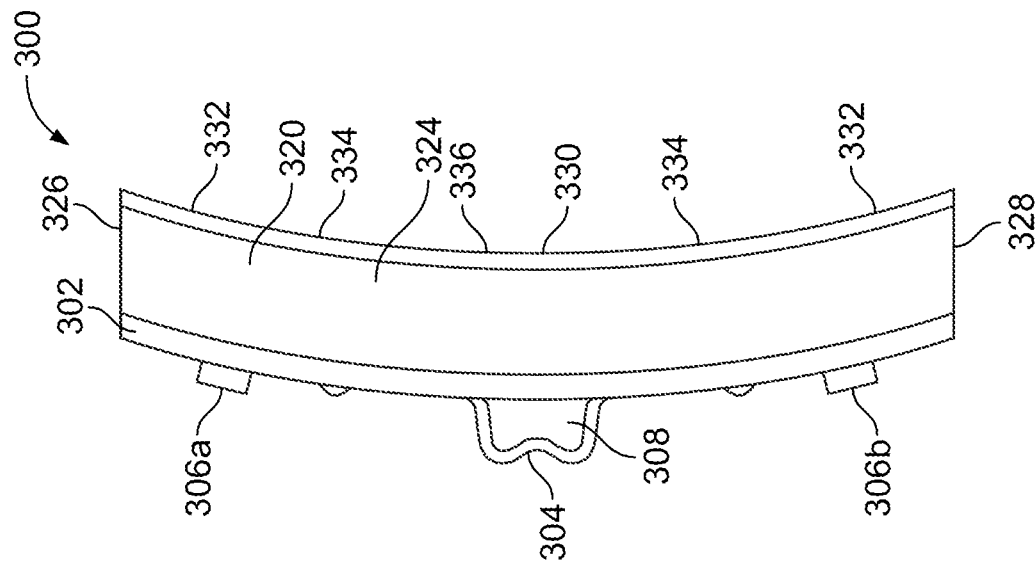
FIG. 31 is a side view of the friction device shown in FIG. 30.
Figure 30:
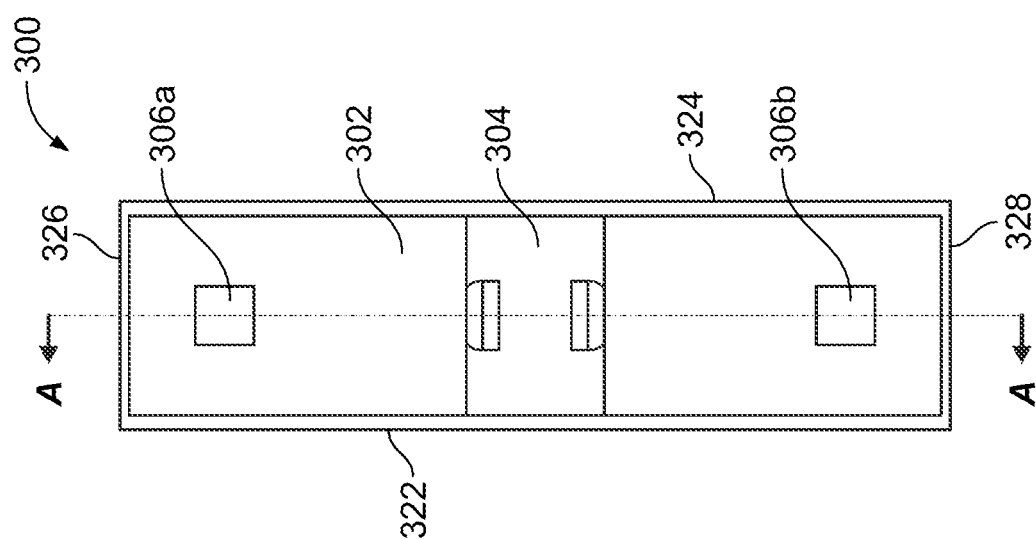
FIG. 30 is a top view of another example of a friction device with a bonded insert.

As shown in FIGS. 30 and 31, a friction device 300 in accordance with one embodiment is illustrated. The friction device may include a backing plate 302 that may be made of metallic material such as steel. However, the backing plate may be made of reinforced composite materials that are suitable for use with railway vehicles. The backing plate may be arcuate in shape. This may permit the friction device to properly interact against a vehicle wheel tread. The backing plate may include a pair of rejection lugs 306a, 306b. The rejection lugs may be integrally formed with the backing plate and may extend from a top surface thereof. The rejection lugs are sized and positioned in such a way to mate with corresponding rejection lug receptacles (not shown) on a corresponding brake head (not shown). The rejection lugs may be compatible with a variety of brake heads or may only correspond with a certain type of brake head, or may engage only in one orientation, to prevent the installation of the friction device on an improper brake head or in an improper manner.

In one embodiment, the friction device may include a key bridge 304. The key bridge may be integrally formed with the backing plate or may be attached to the backing plate prior to installation. Like the backing plate, the key bridge may be made of a metallic material or a reinforced composite material. The key bridge may be coupled to a brake head (not shown) of a vehicle, such as a rail vehicle or another type of vehicle. An opening 308 in the key bridge may accept a locking key (not shown) which fastens the friction device to the vehicle brake head. In embodiment shown, the key bridge may be M shaped. In other embodiments, the key bridge may be circular, triangular, or take any other shape necessary to facilitate fastening of the key bridge to the brake head.

In one embodiment, the composition friction material may be affixed to and extends from the backing plate along the surface opposite the rejection lugs and key bridge. To be affixed to the backing plate, the composition friction material may include an adhesion layer. The adhesion layer may facilitate proper fixture to the backing plate, secure the composition friction material to the backing plate, allow some flex or compliance to maintain adhesion during use, and the like. The composition friction material may be affixed to the backing plate by another technique. The composition friction material may have two opposite lateral ends or sides 322, 324 and two opposite longitudinal ends or sides 326, 328. The lateral ends extend along the length of the friction device, and the longitudinal ends extend between the lateral ends. The composition friction material forms a brake surface of the friction device. The brake surface contacts the vehicle wheel tread to apply a braking force to the vehicle. The composition friction material may be a composite material that provides the required friction and braking effort when forced against the tread of the wheel. A suitable composite material may be a material that can provide the proper braking force to the wheel tread. Although a composite material may be used in one embodiment, the material providing the braking force need not be composite in other embodiments. Rather, it may be a metal or metal alloy that can apply the proper braking force to the wheel.

Figure 32:
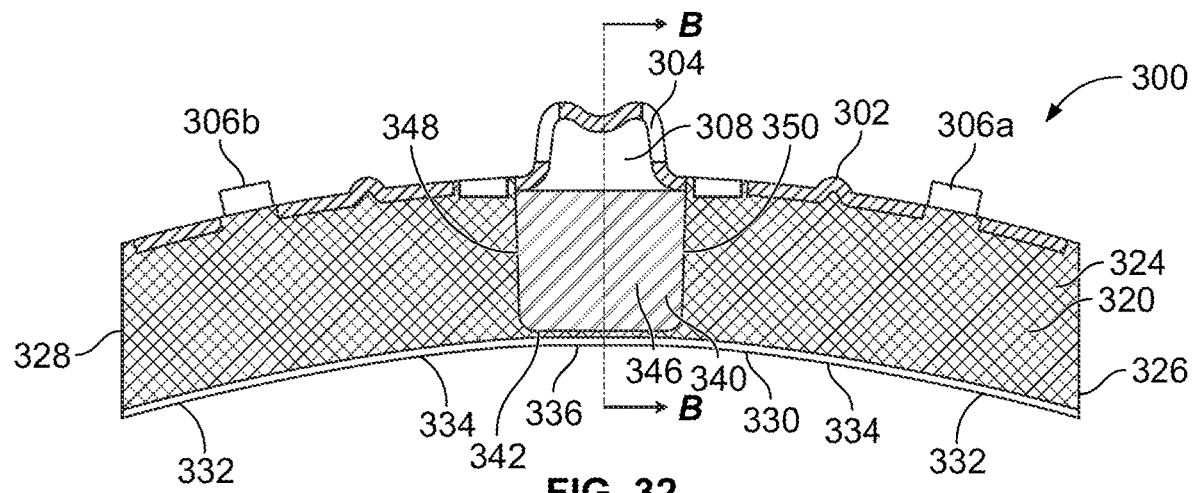
FIG. 32 is a cross-sectional view of the friction device shown in FIG. 30 along line A-A in FIG. 30.

The composition friction material generally takes the arcuate shape of the backing plate so as to properly interact against a vehicle wheel tread. The brake surface may take the arcuate shape of the backing plate. As shown in FIGS. 31 and 32, the brake surface, while still adhering to the arcuate shape of the backing plate, may have different radii of curvature. First outside portions 332 of the brake surface may have a first radii of curvature and second inner portions 334 may have a second radii of curvature. A central portion 336 of the brake surface may have a third radii of curvature. The radius of curvature of the central portion may generally correspond to a wheel engaging surface 342 of a tread conditioning insert 340.

Referring now to FIGS. 32 through 37, a tread conditioning insert 340 may be disposed in the composite friction material. The tread conditioning insert may have a wheel engaging surface 342, two opposite lateral sides 344, 346 and two opposite longitudinal sides 348, 350. The wheel engaging surface may be for conditioning the railway vehicle wheel tread. The tread conditioning insert may be bonded to and adheres to the composite friction material, so that the insert may be surrounded by the composite friction material within the friction device. The Figures show an embodiment in which a tread conditioning insert is fully surrounded by the composite friction material. In another embodiment, a wheel engaging surface 342 may be exposed to and flush with the brake surface. In either instance, the wheel engaging surface of the tread conditioning insert may be arcuate in shape so to permit conditioning of the vehicle wheel tread. In instances where the composite friction material fully surrounds and encapsulates the tread conditioning insert, the repeated braking of the vehicle will wear away the composite friction material eventually exposing the wheel engaging surface of the tread conditioning insert. While only a single tread conditioning insert 340, multiple tread conditioning inserts may be disposed along the friction device.

The tread conditioning insert may be formed by a hardened material such as cast iron, another metal or metal alloy, or a sintered material. The tread conditioning insert can be formed of another material with suitable abrasive properties for the tread conditioning insert's application. As the friction device is applied to the surface of a wheel tread, the tread conditioning insert rubs against the wheel surface. The abrasive properties of the insert conditions the wheel surface to prevent, reduce, or remove defects. The abrasive properties may lead to better friction performance in extreme conditions. There may be some manufacturing defects in the wheel, or the wheel may form defects on the wheel surface during operation of the vehicle. By including the tread conditioning insert within the composition material, the friction device combines the braking of the composite friction material with the wheel conditioning advantages of the tread conditioning insert. Along with the conditioning, the tread conditioning insert may serve to provide a braking force that may be helpful in adverse weather conditions.

The tread condition insert may serve to conduct heat away from the wheel tread during operation, which helps prevent overheating of the wheel. However, when the tread conditioning insert may be fully encapsulated by the composite friction material, the composite friction material serves to insulate the insert, thereby restricting heat transfer away from the wheel tread.

Figure 33:
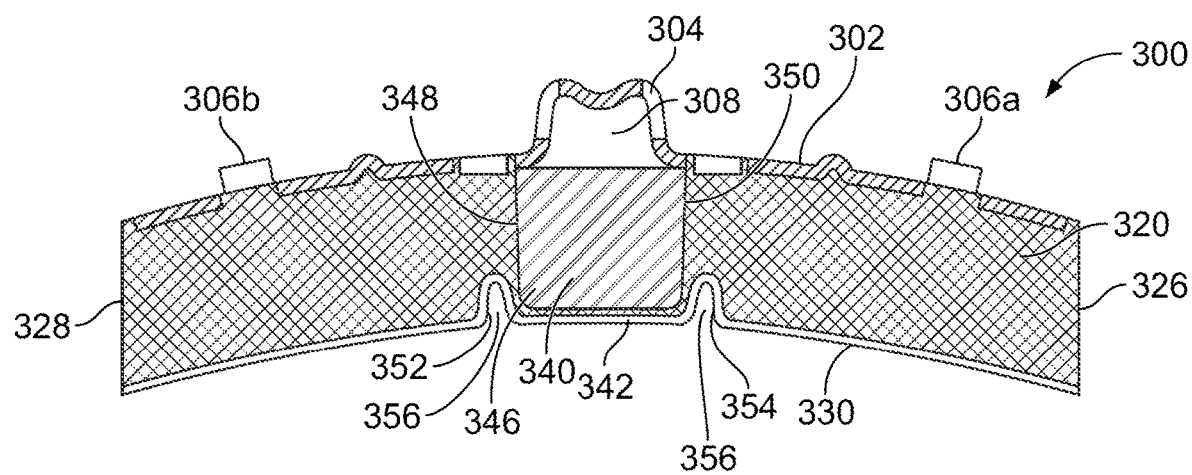
FIG. 33 is a cross-sectional view of the friction device shown in FIG. 30 along line A-A in FIG. 30.

Referring now to FIG. 33, optional grooves may be provided in the composite friction material adjacent to the two longitudinal sides of the tread conditioning insert. The grooves may extend partially across the opposite longitudinal sides or fully across the longitudinal sides. As shown in FIG. 33, the grooves may extend partially into the composite friction material. Suitable grooves may extend from the brake surface all the way to the backing plate. The grooves may provide an air gap 356 between the tread conditioning insert and the composite friction material. This air gap permits heat to be transferred from the wheel tread to the tread conditioning insert and then to the ambient air. This may allows the friction device to dissipate heat from the wheel tread during use.

Figure 34:
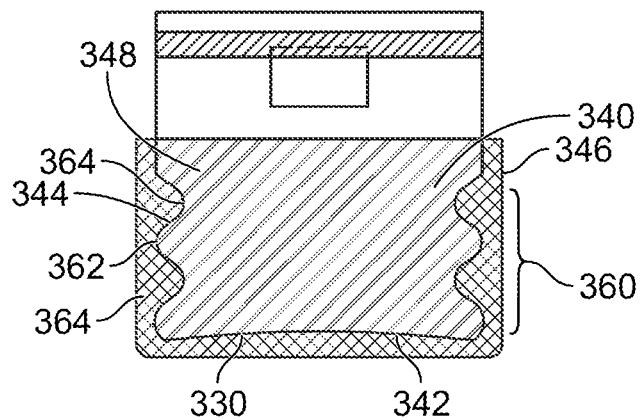
FIG. 34 is a cross-sectional view of the friction device shown in FIG. 32 along line B-B in FIG. 32.
Figure 35:
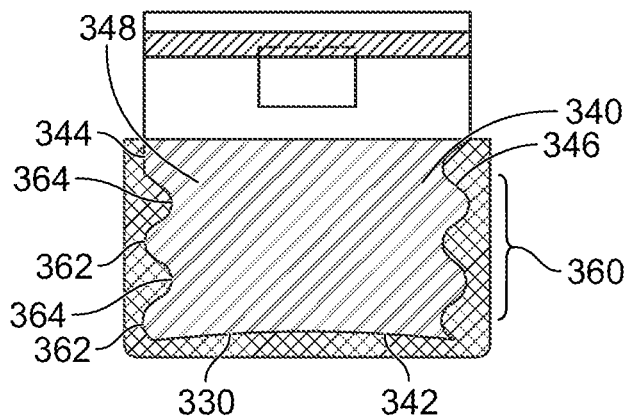
FIG. 35 is a cross-sectional view of the friction device shown in FIG. 31 along line B-B in FIG. 32.
Figure 36:
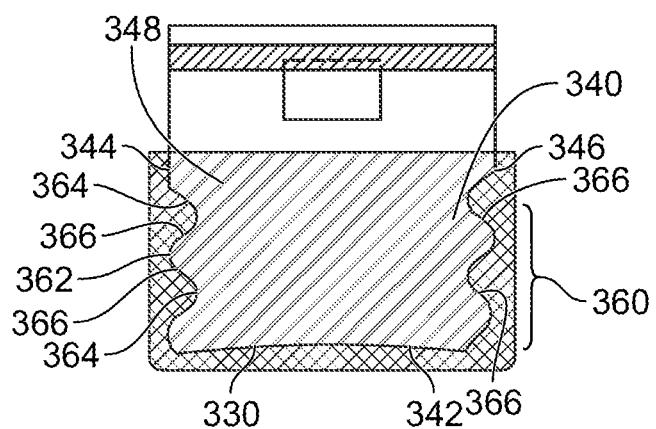
FIG. 36 is a cross-sectional view of the friction device shown in FIG. 31 along line B-B in FIG. 32.

Referring now to FIGS. 34 through 36, the tread conditioning insert may take various shapes that are advantageous to both the conditioning of the wheel tread and the bonding of the tread conditioning insert to the composite friction material. The shapes may increase the pull-off strength required to separate or loosen the tread conditioning insert from the composition friction material, therefore improving the bonding between the tread conditioning insert and the composition friction material. The tread conditioning insert may include wave-like convolutions or undulations 360. The undulating surfaces can be along the opposite sides 344, 346. The undulating surfaces provide the tread conditioning insert with various shapes to provide the aforementioned advantageous conditioning of the wheel tread. As shown in FIGS. 34 through 36, the undulations are located on the lateral sides of the tread condition insert. The undulations may be located on the longitudinal sides of the tread condition insert. The undulations may be located on the lateral sides and the opposite longitudinal sides simultaneously.

The undulations include convex and concave portions 362, 364. The convex portions extend outwardly of the opposite lateral sides of the tread conditioning insert as projections and the concave portions extend inwardly of the opposite lateral sides as recesses. Multiple convex and concave portions are shown, alternatively, a single convex and concave portion or a single convex and concave portion may be provided on the opposite lateral sides or the opposite longitudinal sides of the tread conditioning insert. The portions change the surface area of the wheel engaging surface of the tread conditioning insert as repeated uses of the friction device wear away the tread conditioning insert. During use, the surface area of the wheel engaging surface may decrease and increase in size across the wheel engaging surface. This changing surface area allows for regeneration of the surface of the wheel tread, but the regeneration may be less aggressive than if the tread conditioning insert had a constant surface area across the wheel engaging surface. The changing surface area prevents over conditioning on some areas of the wheel tread. The organization of the convex and concave portions and the changing surface area of the wheel engaging surface is described below.

A first configuration of the tread conditioning insert is shown in FIG. 34. This configuration aligns the convex portions on the first lateral side with the convex portions on the second opposite lateral side. The concave portions on the lateral sides align with each other. The maximum points or peaks of the convex portions on the first lateral side may align with (e.g., are equidistantly located from a common surface along directions that are perpendicular to that surface) the maximum points or peaks of the convex portions on the second opposite lateral side. The minimum points or nadirs of the concave portions on the first opposite lateral side align with the minimum points or nadirs of the concave portions on the second opposite lateral side (e.g., are equidistantly located from a common surface along directions that are perpendicular to that surface). This configuration of the convex and concave portions results in the surface area of the wheel engaging surface of the tread conditioning insert to shrink and grow across the surface of a wheel tread as use of the friction device results in the tread conditioning insert to wear away.

Referring now to FIG. 35, a second configuration of the tread conditioning insert is shown. This configuration aligns the convex portions on a first lateral side with the concave portions on the second lateral side. The concave portions on the first lateral side align with the convex portions on the second lateral side. For example, the maximum points or peaks of the convex portions on one of the lateral sides align with the minimum points or nadirs of the concave portions 64 on the other later side 44, 46. Points, peaks, or nadirs may align with each other when the aligned points, peaks, or nadirs are equidistant from a common surface along directions that are perpendicular to the common surface. This configuration of portions results in the surface area of the wheel engaging surface remaining the same although the portion of the wheel tread the wheel engaging surface conditions changes as the tread conditioning insert 40 wears away during use of the friction device.

Referring now to FIG. 36, a third configuration of the tread conditioning insert is shown. This configuration aligns the convex portions on the first lateral side with a midpoint 366 between the convex and concave portions on the second lateral side. The concave portions on the first lateral side align with the midpoints between convex and concave portions on the second lateral side. Each midpoint may be located halfway between a peak of a convex portion and a nadir of a neighboring concave portion along the undulating surface between the convex portion and the concave portion. Points, peaks, nadirs, and/or midpoints may align with each other when the aligned points, peaks, or nadirs are equidistant from a common surface along directions that are perpendicular to the common surface.

This configuration can align the convex and concave portions on the second lateral side with the midpoints between the convex and concave portions on the first lateral side. This configuration of portions can result in the surface area of the wheel engaging surface remaining the same although the portion of the wheel tread the wheel engaging surface conditions changes as the tread conditioning insert wears away during use of the friction device.

In one embodiment, a conditioning insert of a friction device may have a body having a conditioning surface that may engage a wheel, opposite first and second sides intersecting the conditioning surface, and opposite third and fourth sides intersecting the conditioning surface. Each of the first and second sides extend from the third side to the fourth side. The body may define one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device.

Optionally, the body may define the recess as an elongated groove extending across the first side from the third side to the fourth side. The elongated groove can be a first groove of a plurality of separate grooves in the body. The separate grooves can be oriented parallel to each other and to the conditioning surface. The elongated groove can extend across each of the first side, the second side, the third side, and the fourth side. The body can include the protrusion as one or more elongated columns projecting from at least one of the first side, the second side, the third side, and/or the fourth side. The body can include the protrusion as one or more fins projecting from at least one of the first side, the second side, the third side, and/or the fourth side and that are elongated in directions that are parallel to the conditioning surface.

The body can include the recess extending into less than all of the first side, the second side, the third side, and the fourth side, and the body defines the projection protruding from one or more of the first side, the second side, the third side, and/or the fourth side that does not include the recess. The body can include a base portion and one or more extended portions outwardly extending from the base portion and toward a friction surface of the friction device. The extended portions can include one or more of the recess and/or the protrusion. The body can include at least two of the extended portions that are offset from each other along a circumferential direction that encircles a surface of the wheel.

A friction device for a wheel may include friction material may engage a surface of the wheel to slow or stop movement of the wheel and a conditioning insert embedded in the friction material. The conditioning insert may have a body having a conditioning surface that may engage the surface of the wheel, opposite first and second sides intersecting the conditioning surface, and opposite third and fourth sides intersecting the conditioning surface. Each of the first and second sides extends from the third side to the fourth side. The body may have one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device. Optionally, the body may define the recess as an elongated groove extending across at least the first side from the third side to at least the fourth side. The elongated groove can extend across each of the first side, the second side, the third side, and the fourth side.

The body can include the protrusion as one or more elongated columns projecting from at least one of the first side, the second side, the third side, and/or the fourth side. The body can include the protrusion as one or more fins projecting from at least one of the first side, the second side, the third side, and/or the fourth side and that are elongated in directions that are parallel to the conditioning surface.

The body can include the recess extending into less than all of the first side, the second side, the third side, and the fourth side, and the body can include the projection protruding from one or more of the first side, the second side, the third side, and/or the fourth side that does not include the recess.

A friction device for use on a vehicle may include a backing plate adapted to interface with a brake head of the vehicle, friction material disposed on the backing plate to form a brake surface that engages a wheel of the vehicle, and at least one conditioning insert disposed within the friction material. The conditioning insert may include a conditioning surface that may face the wheel, opposite first and second sides intersecting the conditioning surface, and opposite third and fourth sides intersecting the conditioning surface. Each of the first and second sides extends from the third side to the fourth side. The at least one conditioning insert may have one or more of (a) a recess extending into one or more of the first side, the second side, the third side, or the fourth side and may receive friction material of the friction device and/or (b) a protrusion extending out of the first side, the second side, the third side, or the fourth side and into the friction material of the friction device. Optionally, the at least one conditioning insert may define the recess as an elongated groove extending across at least the first side from the third side to at least the fourth side.

The at least one conditioning insert can include the protrusion as one or more elongated columns projecting from at least one of the first side, the second side, the third side, and/or the fourth side. The conditioning insert can include the protrusion as one or more fins projecting from at least one of the first side, the second side, the third side, and/or the fourth side and that are elongated in directions that are parallel to the conditioning surface.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise. Spatial or directional terms, such as "left", "right", "inner", "outer", "above", "below", and the like, relate to the disclosure as shown in the drawing figures and are not to be considered as limiting as the disclosure can assume various alternative orientations. All numbers and ranges used in the specification and claims are to be understood as being modified in all instances by the term "about". By "about" meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or sub ratios subsumed therein. For example, a stated range or ratio of "1 to 10" should be considered to include any subranges or sub ratios between (and inclusive of) the minimum value of 1 and the maximum value of 10; that is, all subranges or sub ratios beginning with a minimum value of 1 or more and ending with a maximum value of 10 or less. The ranges and/or ratios disclosed herein represent the average values over the specified range and/or ratio. As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular" or "substantially perpendicular" mean a relative angle as between two objects at their real or theoretical intersection is from 85° to 95°, or from 87° to 93°, or from 88° to 92°, or from 89° to 91°, or from 89.5° to 90.5°, or from 89.75° to 90.25°, or from 89.9° to 90.1°, inclusive of the recited values.

The terms "first", "second", and the like are not intended to refer to any particular order or chronology, but refer to different conditions, properties, or elements. The term "at least" is synonymous with "greater than or equal to". The term "not greater than" is synonymous with "less than or equal to". As used herein, "at least one of" is synonymous with "one or more of". For example, the phrase "at least one of A, B, and C" means any one of A, B, or C, or any combination of any two or more of A, B, or C. For example, "at least one of A, B, and C" may include one or more of A alone; or one or more B alone; or one or more of C alone; or one or more of A and one or more of B; or one or more of A and one or more of C; or one or more of B and one or more of C; or one or more of all of A, B, and C. The terms "includes" and "may include" are synonymous with "comprises".

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A friction device, comprising:
    a backing plate connected with a friction material having a braking surface configured to engage a surface of a rotating part to slow or stop rotation of the rotating part;
    a conditioning insert at least partially embedded within the friction material, the conditioning insert extending from the backing plate toward the braking surface of the friction material, the conditioning insert including a conditioning surface spaced apart from the backing plate and positioned to face the surface of the rotating part, the conditioning insert including opposite first and second longitudinal sides that extend from the backing plate to the conditioning surface and opposite first and second lateral sides that extend from the backing plate to the conditioning surface, wherein the conditioning surface is encapsulated within the friction material, and wherein, after repeated use of the friction device, the friction material is configured to wear away and expose the conditioning surface of the conditioning insert,
    one or more of the first longitudinal side, the second longitudinal side, the first lateral side, or the second lateral side of the conditioning insert including one or more protrusions extending away from the one or more of the first longitudinal side, the second longitudinal side, the first lateral side, or the second lateral side and into the friction material, wherein the one or more protrusions are spaced apart from the backing plate.

2. The friction device of claim 1, wherein each of the first longitudinal side and the second longitudinal side of the conditioning insert extends from the first lateral side to the second lateral side.

3. The friction device of claim 1, wherein the one or more protrusions extend from the conditioning insert in directions that do not intersect the surface of the rotating part.

4. The friction device of claim 1, wherein the one or more protrusions include multiple protrusions comprising elongated columns.

5. The friction device of claim 1, wherein the one or more protrusions include multiple protrusions comprising fins.

6. The friction device of claim 5, wherein the fins are parallel to each other.

7. The friction device of claim 5, wherein the fins are tapered.

8. The friction device of claim 1, wherein the one or more protrusions include multiple protrusions comprising one or more columns and one or more fins.

9. The friction device of claim 1, wherein the one or more protrusions are positioned along a length of the conditioning insert as a wear indicator of the friction material.

10. The friction device of claim 1, wherein the one or more protrusions include multiple protrusions spaced apart from each other by a distance that is shorter than a distance between the backing plate and the protrusion that is closest to the backing plate.

11. The friction device of claim 1, wherein the conditioning surface of the conditioning insert is a convex arcuate surface, and wherein the braking surface of the friction material includes a convex arcuate surface offset from the convex arcuate surface of the conditioning insert.

12. The friction device of claim 1, wherein the friction material extends from a first longitudinal end to an opposite second longitudinal end and from a first lateral side to an opposite second lateral side, the conditioning insert is a first conditioning insert, and further comprising:
    a second conditioning insert at least partially embedded within the friction material, the second conditioning insert extending from the backing plate toward the braking surface of the friction material, the second conditioning insert offset from the first conditioning insert such that the second conditioning insert is located closer to one or both the first longitudinal end and the first lateral side than the first conditioning insert.

13. The friction device of claim 1, wherein the one or more protrusions are spaced apart from the backing plate such that a portion of the friction material is positioned between each of the one or more protrusions and the backing plate.

14. The friction device of claim 1, wherein the braking surface defines an arcuate shaped braking surface, wherein the friction material comprises an extended portion extending away from the arcuate shaped braking surface, and wherein the conditioning insert defines an extended portion extending into the extended portion of the friction material.

15. The friction device of claim 14, wherein the extended portion of the friction material is a protrusion extending away from the arcuate shaped braking surface.

16. A friction device, comprising:
    a backing plate connected with a friction material configured to engage a surface of a rotating part to slow or stop rotation of the rotating part; and
    a conditioning insert at least partially embedded within the friction material, the conditioning insert extending from the backing plate toward a braking surface of the friction material, the conditioning insert including a conditioning surface spaced apart from the backing plate and positioned to face the surface of the rotating part, the conditioning insert including opposite longitudinal sides extending from the backing plate to the conditioning surface and opposite lateral sides extending from the backing plate to the conditioning surface, wherein the conditioning surface is encapsulated within the friction material, and wherein, after repeated use of the friction device, the friction material is configured to wear away and expose the conditioning surface of the conditioning insert, one or more of the longitudinal sides or the lateral sides of the conditioning insert including protrusions extending away from the one or more of the longitudinal sides or the lateral sides and into the friction material, wherein the protrusions are spaced apart from the backing plate.

17. The friction device of claim 16, wherein the protrusions include elongated columns.

18. The friction device of claim 16, wherein the protrusions include fins.

19. The friction device of claim 16, wherein the protrusions include one or more columns and one or more fins.

20. The friction device of claim 16, wherein one or more of the protrusions are positioned along a length of the conditioning insert as a wear indicator of the friction material.

21. The friction device of claim 16, wherein the protrusions are spaced apart from each other by a distance that is shorter than a distance between the backing plate and the protrusion that is closest to the backing plate.

22. The friction device of claim 16, wherein the protrusions are spaced apart from the backing plate such that a portion of the friction material is positioned between each of the protrusions and the backing plate.

23. The friction device of claim 16, wherein the braking surface defines an arcuate shaped braking surface, wherein the friction material comprises an extended portion extending away from the arcuate shaped braking surface, and wherein the conditioning insert defines an extended portion extending into the extended portion of the friction material.

24. The friction device of claim 23, wherein the extended portion of the friction material is a protrusion extending away from the arcuate shaped braking surface.

25. A friction device, comprising:
   a backing plate connected with a friction material having a braking surface configured to engage a surface of a rotating part to slow or stop rotation of the rotating part; and
   a conditioning insert at least partially embedded within the friction material, the conditioning insert extending from the backing plate toward the braking surface of the friction material, the conditioning insert including a conditioning surface spaced apart from the backing plate and positioned to face and condition the surface of the rotating part, the conditioning insert including sides that extend from the backing plate to the conditioning surface, wherein the conditioning surface is encapsulated within the friction material,
   one or more of the sides of the conditioning insert including protrusions extending away from the one or more of the sides and into the friction material, wherein the protrusions are spaced apart from the backing plate.

26. The friction device of claim 25, wherein the protrusions include one or more of pins or columns.

27. The friction device of claim 25, wherein the one or more protrusions are spaced apart from the backing plate such that a portion of the friction material is positioned between each of the protrusions and the backing plate.

28. The friction device of claim 25, wherein the braking surface defines an arcuate shaped braking surface, wherein the friction material comprises an extended portion extending away from the arcuate shaped braking surface, and wherein the conditioning insert defines an extended portion extending into the extended portion of the friction material.

29. The friction device of claim 28, wherein the extended portion of the friction material is a protrusion extending away from the arcuate shaped braking surface.

30. The friction device of claim 25, wherein, after repeated use of the friction device, the friction material is configured to wear away and expose the conditioning surface of the conditioning insert.

* * * * *